United States Patent [19]
Rebane

[11] Patent Number: 6,078,904
[45] Date of Patent: Jun. 20, 2000

[54] RISK DIRECT ASSET ALLOCATION AND RISK RESOLVED CAPM FOR OPTIMALLY ALLOCATING INVESTMENT ASSETS IN AN INVESTMENT PORTFOLIO

[75] Inventor: George J. Rebane, Topanga, Calif.

[73] Assignee: Saddle Peak Systems, Topanga, Calif.

[21] Appl. No.: 09/042,592

[22] Filed: Mar. 16, 1998

[51] Int. Cl.$^7$ .................................................. G06F 17/60
[52] U.S. Cl. .............................................. 705/36; 705/35
[58] Field of Search ................................ 705/36, 35, 37, 705/1; 186/37

[56] References Cited

U.S. PATENT DOCUMENTS

| | | | |
|---|---|---|---|
| 5,774,881 | 6/1998 | Friend et al. | 705/36 |
| 5,784,696 | 7/1998 | Melnikoff | 705/36 |
| 5,799,287 | 8/1998 | Dembo | 705/36 |
| 5,806,049 | 9/1998 | Petruzzi | 705/36 |
| 5,812,987 | 9/1998 | Luskin et al. | 705/36 |
| 5,812,988 | 9/1998 | Sandretto | 705/36 |
| 5,819,237 | 10/1998 | Garman | 705/36 |
| 5,852,811 | 12/1998 | Atkins | 705/36 |
| 5,884,287 | 3/1999 | Edesess | 705/36 |
| 5,911,135 | 6/1999 | Atkins | 705/36 |

OTHER PUBLICATIONS

Behn, R. D., and Vaupel, J. W., "Quick Analysis for Busy Decision Makers," Basic Books, Inc., Publishers, Range of Risk Dilemmas, pp. 200–214, 1982.

Meyer, S. L., "Data Analysis for Scientists and Engineers," John Wiley & Sons, Inc., Chapter 10, Propagation of Error and Least Squares, pp. 39–40, Sep., 1992.

Papoulis, A., "Probability, Random Variables, and Stochastic Processes," McGraw Hill Book Company, Chapter 5, Sec. 5–4, pp. 151–152, Dec., 1991.

Ross, S. A., Westerfield, R. W., Jaffe, J. F., "Third Edition Corporate Finance," Irwin Series in Finance, Chapter 10, Return and Risk: The Capital–Asset–Pricing Model (CAPM), pp. 271–309, 1996.

Funds Allocation System, Product Brochure, International Business Machines, Dec. 1985.

FPS/Optimum, Product Brochure, Execution Systems Corp. 1986.

Behn, R. D., and Vaupel, J.W., "Quick Analysis for Busy Decision Makers", Basic Books, Inc., Publishers, Range of Risk Dilemmas, pp. 200–214, 1982.

Funds Allocation System, Product Brochure, International Business Machines, Dec. 1985.

FPS/Optimum, Product Brochure, Execution Systems Corp, 1986.

Schmerken, Ivy, "Making Risk Analysis Easy as Alpha, beta (BetaCalc, a Computer Program by M.D. Sass Investor Services", Wall Street Computer Review, v5, n4, p. 8(3), Jan. 1988.

Papoulis, A., "Probability, Random Variables, and Stochastic Processes", McGraw Hill Book Company, Chapter 5, Sec. 5–4, pp. 151–152, Dec. 1991.

Meyer, S. L., "Data Analysis for Scientists and Engineers", John Wiley & Sons, Inc., Chapter 10, Propogation of Error and Least Squares, pp. 39–40, Sep. 1992.

(List continued on next page.)

*Primary Examiner*—Edward R. Cosimano
*Assistant Examiner*—John W. Hayes
*Attorney, Agent, or Firm*—Bradley M. Ganz

[57] ABSTRACT

A computer system and method for optimally allocating investment funds of an investor in a portfolio having a plurality of investments, comprising: determining a risk tolerance function for the investor specifying the investor's probability preference at each of a plurality of monetary amounts relative to a monetary range relevant to the investor, and allocating the investment funds among the investments to create an investment allocation by maximizing an expected value of a first probability density function of the investor's probability preferences determined as a function of a second probability density function of the portfolio's predicted market performance with respect to the investment funds and the investor's risk tolerance function.

29 Claims, 11 Drawing Sheets

Microfiche Appendix Included
(1 Microfiche, 36 Pages)

OTHER PUBLICATIONS

Kevles, Barbara, "Using Asset Allocation Software", Journal of Accountancy, New York, Vol. 176, Issue 5, pp. 83–87, Nov. 1993.

Reagor, Catherine, "Education of Employees on Pension Plans Urged", Business Journal —Serving Phoenix & the Valley of the Sun, v 14, n39, p. 26(1), Jul. 1994.

Glaser, Jeffrey S., "The Capital Asset Pricing Model: Risk Valuation, Judicial Interpretation, and Market Bias", Business Lawyer, vol. 50, n2, Feb. 1995.

Ross, S. A., Westerfield, R. W., Jaffe, J. F., "Third Edition Corporate Finance", Irwin Series in Finance, Chapter 10, Return and Risk: The Capital–Asset–Pricing Model (CAPM), pp. 271–309, 1996.

Mellon Bank Corporation, "Mellon Trust Announces New Products and Enhancements; New Investment Monitor Product Will Be Available Jan. 1", Dialog File 621:New Product Announcement, Oct. 1996.

Lavine, Alan, "Technology Makes it Easier to do Financial Planning (Financial Planning Software)", Accounting Today, v11, n21, p39(2), Nov. 1997.

VALIC, "VALIC Announces Customer Account Access on Web Site", Dialog File 621:New Product Announcement, Jan. 1998.

RISK DIRECT ASSET ALLOCATION AND RISK RESOLVED CAPM FOR OPTIMALLY ALLOCATING INVESTMENT ASSETS IN AN INVESTMENT PORTFOLIO

1. MICROFICHE APPENDIX

This application includes a microfiche appendix, including 1 sheet of microfiche and a total of 36 frames.

2. BACKGROUND

2.1 Field of Invention

The invention relates generally to the field of methods and software products for financial analysis risk management, and more particularly to methods and software products for investment portfolio design and the selection, analysis of investments and the allocation of investment assets among investments.

2.2 Background of the Invention

2.2.1 CAPM & CML Background

In this section we present sufficient background of the Capital Asset Pricing Model (CAPM) and the Capital Market Line (CML) to establish the departure points for derivation of the present invention: Risk Direct Asset Allocation (RDAA) and Risk Resolved CAPM (RR/CAPM). A complete tutorial on modern asset allocation methods, particularly the CAPM and the related Arbitrage Pricing Theory, may be found in any one of a number of good texts on corporate finance [4] (A bibliography of references is found at the end of this disclosure).

The practical application of any quantitative method of portfolio design based on securities' covariance requires the selection of a 'short list' of N risky stocks or other securities. Several studies have shown that the investor begins to gain "almost all the benefits of (portfolio) diversification" at $N \leq 8$, "virtually no risk reduction" for $N > 15$ [14], and measurable liabilities increasing beyond $N = 30$ [15]. The nomination of the short list may be approached as a formal problem in multi-attribute utility [1]. We proceed here with a specified candidate set of N risky securities whose singular utility to the investor is their ability to contribute to a successful portfolio design.

The motivation for going beyond the CAPM, with its ever-present companion query as to "whether variance is the proper proxy for risk" [21], is in the answer that variance is only the progenitor of risk and not its final measure. Between the two there is a road, unique to each investor, to be traveled that lets us individually answer the question "how much of each of the N securities should I—not he and not she—buy and/or hold?" This question is answered by the present invention.

2.2.1.1 Risk

In the CAPM risk is measured by the rate performance dispersion of a security as expressed by its historical rate standard deviation. A primary problem with the CAPM is that once established, this 'sigma' is applied uniformly to all investors independent of the amount they intend to invest or their individual aversion to the possible loss of investment assets. Thus the CAPM has a very egalitarian view of risk, and treats all investors equally, regardless of their total investment assets available for investment and net worth. The levels of risk and the concordant performance of a set of risky securities are quantified by their covariance matrix usually computed from specified historical data.

Suppose we have a candidate portfolio of N risky securities $S_i$, i=[1, N]. We select a past performance epoch $T_{PE}$ and compute the symmetrical N×N covariance matrix [5] for the securities as $$\text{cov } S = E\{(s-\mu)(s-\mu)^T\} \tag{1}$$

where s is the rate of return (column) N-vector of the securities and $\mu$ is the vector of mean or expected returns computed over a past epoch $T_{PE}$ where $$\mu_i = \hat{s}_i, \; i=1,N. \tag{2}$$

We now allocate a portfolio fraction $f_i$ to each of the N securities with the elements of $f$ summing to one. The total rate of return variance of such a portfolio is then given by $$\sigma_S^2(\underline{f}) = \underline{f}^T \text{cov} S \underline{f} \tag{3}$$

which shows the dependence of the portfolio's return variance on the allocation vector $f$. In modern portfolio theory [4] it is $\sigma(f)$ from (3) that gives the uniform measure of portfolio risk for all investors, and thus constrains CAPM to treat all investors equally.

The expected rate of return for each risky security over the investment horizon ($T_I$) is predicted on the basis of its beta ($\beta$) computed with respect to 'the market' (e.g. S&P500) as follows.

$$\beta_i = \frac{\sigma_{i,M}^2}{\sigma_M^2} = \frac{\text{cov}(s_i, R_M)}{\sigma_M^2} \tag{4}$$

The familiar beta is further represented as the slope of a straight line relationship between market variation and the security in question. The frequently omitted alpha ($\alpha$) parameter defines the intercept of the least squares regression line that best fits a set of security and market return rates. A method for predicting a stock's price $\hat{R}_M$ from a prediction of market performance $\hat{R}_M$ over $T_i$ then yields $$\hat{s}_i = \alpha_i + \beta_i \hat{R}_M \tag{5}$$

The classical CAPM formula for $\hat{s}_i$ [4] generates the Security Market Line $$\hat{s}_i = R_{RF} + \beta_i \times (\text{historical market risk premium}) \tag{6}$$

$$= R_{RF} + \beta_i(\hat{R}_M - R_{RF})$$

where $R_{RF}$ is the current risk free lending rate (the historical market risk premium has been calculated at 8.5%) and $\hat{R}_M$ is the expected return on the market over the investment horizon.

Keeping in mind the ability here to use other predictive security return models, in the remainder we will use the more straightforward (6) for predicting the performance of a security and understand the quoted 'sigma' (standard deviation) of such a security to derive from the regression fit of K points [5] over $T_{PE}$.

$$\sigma_i = \sqrt{\frac{1}{K-1} \sum_{k=1}^{K} \{s_k - (\alpha_i + \beta_i R_{M,k})\}^2} \tag{7}$$

Combining a security's expected rate of return and its standard deviation then yields the needed parameters for its assumed probability density function (p.d.f.) which fully characterizes the performance of the individual security with respect to the specified future performance of the market $\hat{R}_M$ over $T_I$.

For the RR/CAPM and RDAA developments below we additionally acknowledge an uncertain future market and express this by its variance $\sigma_M^2$ to reflect the dispersion about the predicted mean return $\hat{R}_M$. This additional uncertainty will be reflected in a given security's 'sigma' to yield its total standard deviation as $$\sigma_{T,i} = \sqrt{\sigma_i^2 + \beta_i^2 \sigma_M^2} \quad (8)$$

2.2.1.2 The Feasible and Efficient Sets

From corporate finance texts [4] we learn that a set of points termed the feasible set can be represented in 2-space where expected portfolio return $\hat{R}_p$ is plotted (FIG. 1) against the standard deviation $s_s$ of the portfolio given in (3). The expected return of the 'risky' portfolio allocated according to $f$ is simply $$\hat{R}_p = \sum_{i=1}^{N} f_i \hat{s}_i \quad (9)$$

The efficient set is defined as the upper boundary of the feasible set drawn upward from the 'minimum variance point' (MVP) since it is not reasonable to choose portfolios with the lesser expected gains for the same 'risk' as measured by the portfolio's $\sigma_s$. Therefore, according to the CAPM the optimal portfolios are all represented by the infinite set of optimal allocation vectors $\{f^*\}$ that define this upper boundary. The CAPM proceeds to resolve the problem further by introducing the risk free lending option which gives rise to the Capital Market Line.

2.2.1.3 The Capital Market Line

As shown in FIG. 1, when we introduce the risk free lending option at rate $R_{RF}$, we add the (N+1)th instrument and increase the dimension of the investor's decision space to N. The CAPM argues that the optimum portfolio now lies along a line—the Capital Market Line (CML)—that originates from (0, $R_{RF}$) and is tangent to the efficient set at some point E for which a unique $f^*$ can be discovered. Selecting a point between (0, $R_{RF}$) and E defines what fraction should be invested risk free with the remainder being invested pro rata at $f^*$. Points closer to E represent a larger fraction going into the risky portfolio of N stocks.

We note that the computation of the efficient set per se is not required for the solution of $f^*$. As seen from FIG. 1, it is clear that if the slope of the CML is maximized within the constraints that $f$ is a fraction vector whose elements sum to unity, then we would automatically obtain point E and the resulting CML. The needed slope is given by $$\tan\theta = \frac{R_E(\underline{f}) - R_{RF}}{\sigma_E(\underline{f})} \quad (10)$$

where $R_E$ and $\sigma_E$ are the coordinates of E which depend on $f$. The optimal risky fraction is then obtained directly by solving the constrained non-linear optimization problem [7],[8].

$$\underline{f}^* = \arg\max_{\underline{f}} \left[ \frac{R_E(\underline{f}) - R_F}{\sigma_E(\underline{f})} \right] \quad (11)$$

which yields $R_E^*(f^*)$ and $\sigma_E^*(f^*)$ from (9) and (3) respectively.

The resulting (fractional) portfolio design $f_p$ is finally determined from $$\underline{f}_P = [f_{RF}, (1 - f_{RF})\underline{f}_R^{*T}]^T \quad (12)$$

by appropriately selecting $f_{RF}$.

The Capital Market Line is presented as the efficient set of both risky and risk free investments and culminates the CAPM's efforts at defining a portfolio by leaving the investor with yet another infinite set of options from which to choose. At this point the CAPM simply asks the investor to apply his/her own method for picking $f_{RF}$, or as stated in [4]:

"Her position in the riskless asset, that is, the choice of where on the (CML) line she wants to be, is determined by her internal characteristics, such as her ability to tolerate risk."

The CAPM offers no guidance of any analytical method for determining each investor's allocation of investment assets on the CML.

We note that during the course of the CAPM solution there has been no discussion of actual cash amounts to be invested. The presumption being all along that, however finally obtained, the risky portfolio fractions $f_R^*$ would apply equally to billionaires and blue collar workers. This assumption thus fails to recognize that individual investors have distinct risk preferences that are intimately tied to their overall investment assets and net worth, and that as a result, would select different allocations of their investment assets.

Accordingly, it is desirable to provide a computer implemented method and software product that accounts for individual investor risk preferences as a function of the individual investor's financial profile, and thereby determines for a given portfolio of investments (i.e. short list), the optimal allocation of the investor's assets, or any portion thereof, among the investment assets.

SUMMARY OF THE INVENTION

The present invention, the Risk Direct Asset Allocation and Risk Resolved CAPM, overcomes the limitations of conventional portfolio design methods including the CAPM, and software products by determining for an individual investor that investor's risk tolerance function and selecting a monetary allocation of investment assets according to both the risk tolerance function, and quantifiable risk dispersion characteristics of a given allocation of investment assets in the portfolio. Generally RDAA and RR/CAPM are based on integrating key elements of modem utility, securities' performance prediction, and optimization theories (see, e.g., [1,], [2], [3]) that relate to risk averse behavior in matters of monetary uncertainty.

3.1 Investor Utility and Probability Preference Curves

In accordance with one embodiment of the present invention, a risk tolerance function ("RTF") of the individual investor is determined. The risk tolerance function describes the investor's probability preferences at each of the number of monetary amounts relative to the investor's total assets. More specifically, at a given the monetary amount A, the risk tolerance function for an investor defines the probability PP(A) at which the investor is indifferent between 1) receiving the monetary amount A, or 2) accepting the risk or gamble of receiving an investor defined putative best amount $A_H$ (for 'happiness' representing monetary contentment at which net worth the investor is willing to suffer essentially zero risk for further increasing his net assets) with probability PP(A) or losing his monetary assets and ending up at an investor defined putative worst amount $A_D$ (for 'despair') with probability 1-PP(A). The amounts $A_D$ and $A_H$ enclose the investor's total net current assets $A_T$. Preferably all investment amounts and outcome calculations will be based on $A_T$ and appropriate changes to this value. Some investors may instead consider $A_T$ to be net investable assets or even their net worth. Overall then, the risk tolerance function quantitatively defines the investor's risk aversion or risk seeking behavior with respect to his unique monetary range of specified monetary amounts. Thus, the risk tolerance function is specifically scoped to the investor's actual and unique monetary range which includes his total investment assets so that it realistically quantifies the investor's preferences with respect to potential outcomes effecting the investor's assets, and hence usefully describes (i.e. quantifies probabilistically ) the investor's preferences as to the market risk presented by various allocations of investment assets within a portfolio.

The investor's risk tolerance function is derived interactively in a straightforward and systematic manner through a sequence of decisions involving so-called reference gambles. Examples of several risk tolerance functions for three different investors are shown in FIG. 2. In this figure, the normalized PP value varies between 0 and 1 as the monetary outcome ranges from the investor's putative worst amount $A_D$, to the amount of monetary contentment $A_H$, such that $PP(A_D)=0$ and $PP(A_H)=1$. It is seen that the risk averse behaviors assumed here are represented by concave downward functions. The straight line joining $PP(A_D)$ and $PP(A_H)$ is the expected monetary value (EMV) line which characterizes the behavior of a risk neutral individual. Consequently the risk seeker's curve lies below the EMV line and is concave upward.

We note that the different risk tolerance functions in FIG. 2 represent different individuals as indicated. The fact that one risk tolerance function, RTF3, goes into negative territory states that this investor is willing to assume some resulting debt as the worst monetary outcome of risky investment schemes. It is reasonable, though not necessary, to assume that most mature or older investors will be risk averse with $A_D>0$ such as in RTF1 and RTF2. All reasonable investors will exhibit $A_H>A_T$.

The monetary difference between the PP curve and EMV line at a given $PP(A_{EMV})$ value is called the investor's risk premium (RP) and is seen to be the amount the investor is willing to forego or pay in order to avoid the (fair) expected value gamble at $PP(A)$. In the figure we see that all other asset parameters given equal, Investor #1 is more risk averse than Investor #2 since RP1>RP2. Investor #3 appears to be a young person with little total assets who would be risk seeking soon after going into debt.

3.2 A General Overview of RR/CAPM and RDAA

For any given allocation of investment assets among investments in the portfolio, a probability density function can be determined which describes the rate performance dispersion of the portfolio's predicted market performance. Conventionally, this probability density function is typically expressed with respect to a portfolio defined by fractional weightings of the investment assets, since CAPM is unable to distinguish between the risk preferences of different investors. In accordance with the present invention however, the probability density function of the portfolio's predicted market performance is expressed with respect to the investor's available investment assets, and more particularly, with respect to the investor's risk tolerance function. Thus, this probability density function describes the dispersion of potential monetary gains and losses to the investor given a specific allocation of the investor's investment assets among the portfolio. For a given probability density function, there is a mean or expected value of the probability density function. The probability density function of the portfolio, for example, describes the overall expected performance of the portfolio in monetary amounts.

In accordance with one aspect of the present invention, once the investor's monetary risk tolerance function, and the probability density function of a given investment allocation are determined, it is possible to create a probability density function of the investor's probability preferences with respect to the investor's risk tolerance function. This probability density function expresses the dispersion of risk preferences that the investor would experience as a result of the investment allocation. The expected value of this probability density function of the investor's probability preferences thus describes the overall risk preference of the investor for the specific monetary allocation of investment assets (as opposed to the conventional asset independent risk analysis).

In accordance with the present invention then, investment assets are allocated to the investments of the portfolio by maximizing the expected value of the probability density function of the investor's probability preferences. The probability density function of the investor's probability preferences is determined as a function of the probability density function of the portfolio's predicted market performance with respect to the investment assets allocation policy and the investor's risk tolerance function. The investment allocation that maximizes the expected value of the investor's probability preferences best satisfies these preferences as they are defined by the investor's risk tolerance function.

In contrast to conventional approaches, the investment allocation here describes the actual monetary amounts of the investment assets to be allocated to the investments of the portfolio. Further, because the investment allocation is determined with respect to the investor's unique risk tolerance function(s), it accounts for the investor's own particular asset base and their risk aversion or risk seeking behavior relative to such asset base. This contrasts with conventional methods that do not account for either the assets or the risk preferences of investors, and hence treat all investors as 1) having exactly the same assets; and/or 2) having exactly the same risk preferences and tolerances. For this reason, as shown above, conventional approaches based on the CAPM produce only an infinite set of potential allocations, leaving it up to the individual investor to arbitrarily allocate their actual investment assets from among the possible solutions along the CML.

The probability density function on the probability preference of the investor's risk tolerance function may be determined in a variety of manners in accordance with the present invention. In one embodiment, this probability density function is determined by numerically mapping the probability density function of the portfolio with respect to the investment assets through the investor's risk tolerance function and onto the probability preference axis. This embodiment is preferable where there is a significant probability of the investor's total assets falling below $A_D$, the despair amount. Such an outcome is typically predicated by a large rate standard deviation for the portfolio given the investment allocation. The allocation of investment assets amongst the portfolio investments is iteratively adjusted until the expected value of the probability density function on the probability preference axis is maximized. FIG. 3 illustrates an example of the mapping of the probability density function of a given portfolio allocation through an investor's risk tolerance function onto the probability preference axis.

In an alternate embodiment, the expected value of the probability density function of the investor's probability preferences is determined by direct computation. One method of direct computation is by solution of:

$$E(PP|f) = \int_{-\infty}^{\infty} g(A)h(A|f)dA \qquad (13)$$

where:
- $g(A)$ is the investor's risk tolerance function, $g(A) \in [0, 1]$ for $A_D \leq A < A_H$, and $g(A_D)=0$, and $g(A_H)=1$;
- $A_D$ is the investor defined putative worst monetary amount or 'despair' amount;
- $A_H$ is the investor defined putative contentment monetary amount or 'happiness' amount; and,
- $h(A|f)$ is the probability density function of the investment portfolio's predicted performance with respect to the investor's total assets given allocation policy $f$.

The solution to (13) may be usefully approximated by a truncated Taylor series expansion of $g(A)$, the investor's risk tolerance function, about the expected value of $h(A|f)$. One such implementation resolves (13) to:

$$\hat{E}(PP|f) = g[\mu_A(f)] + \frac{1}{2} \left. \frac{d^2 g(A)}{dA^2} \right|_{\mu_A(f)} \sigma_A^2(f) \qquad (14)$$

This form of the equation can be readily optimized over the selected securities for each investor to yield the actual monetary allocation over such securities to the investor's maximum expected monetary probability preference.

An examination of (14) is particularly revealing with respect to asset allocation. The first r.h.s. term is simply a mapping of $\mu_A$ onto the PP axis and is consistent with the fact that all sane RTFs are smoothly and monotonically increasing with A throughout their entire range. The second r.h.s. term is of particular interest since it adjusts the expected value of the mapped cash distribution according to two factors—the curvature of the risk tolerance function and the cash quantified standard deviation of the total portfolio both reflected in the $\mu_A$ region of investor's total assets.

We recall from FIG. 2 that risk aversion is represented by the RTF lying above the EMV line and thereby curving downward with increasing A. This translates to a negative value of the second derivative and means that a term proportional to $\sigma_A^2$ is subtracted from the direct mapping of $\mu_A$ through the RTF. We will refer to one half the RTF's second derivative evaluated at $\mu_A$ as the portfolio risk compensation coefficient (RCC). Therefore as we assume a portfolio design that increases its expected gain along the CML, we see that $\sigma_A$ also increases. Since the RTF flattens out with increasing A, the RCC becomes less negative, but the increasing $\sigma_A$ effect begins to dominate and the mapped mean, according to (14), reaches a maximum and begins decreasing at the optimal allocation point. The opposite occurs for risk seekers whose RTF falls below the EMV line in the $\mu_A$ vicinity; here the RCC is positive and the risk compensation adds to or augments the directly mapped PP value of $\mu_A$. This rewards the investor in such a region of his anticipated total assets. Again, in the practical application of the invented algorithm and methodology to realistic short lists of stocks, the 'risk seeking portfolio' at a high RCC may be characterized by high variance being traded off against a low mean because the risk seeker fully expects the high variance to work for (not against) him. We presume that current portfolio designers can take comfort from this analysis since a directly evolved form of CAPM risk as defined in Modem Portfolio Theory is very much present in the new RR/CAPM method presented here, albeit expressed in monetary (not rate) terms and mapped into the conflict resolving preference probability space.

In accordance with the present invention, the foregoing analysis and computations are embodied in a software product for controlling and configuring a computer to receive data descriptive of various investments and their risk characteristics, to interactively determine an investor's risk tolerance function, to allocate investment assets to an investment portfolio, to compute the probability density function of the portfolio's performance with respect to the investor's assets, and to compute and maximize the expected value of the probability density function of the investor's probability preferences. Additionally, the present invention may also be used in a broader context as a monetary risk management tool to determine asset allocations among sectors (e.g. large cap, bonds, growth, value, technology, metals, and the like) and also to select among candidate projects (e.g. acquire XYZ Inc., introduce product line A vs. B, buy new production facility, and the like) in a corporate planning environment.

3.3 User Interface Features

In accordance with another aspect of the present invention, there are provided various user interfaces that graphically capture and represent the investment allocation of the investment assets, along with useful information describing portfolio performance. One user interface graphically displays for each investment in the portfolio the allocation of the investment assets to the selected securities in terms of both monetary and percentage allocations, along with user definable upper and lower bounds for the allocation. There is also displayed a graphical representation of the expected return of the portfolio given the investment allocation, preferably shown with a confidence interval.

The upper and lower bounds for each investment are dynamically manipulable, and can be adjusted by the user to change the range of potential allocations to the investment. As the user moves an upper or lower bound to allow an increase or decrease in the allocation, the overall investment allocation policy among the portfolio is automatically recomputed in order to again maximize the expected value of the probability density function of the investor's probability preferences. This user interface thus allows the user to easily and dynamically manipulate the investment allocation and observe the impact of such allocations on the expected return of the portfolio.

DETAILED DESCRIPTION OF THE DRAWINGS

DETAILED DESCRIPTION OF THE INVENTION

5.1 System Architecture

Figure 4:
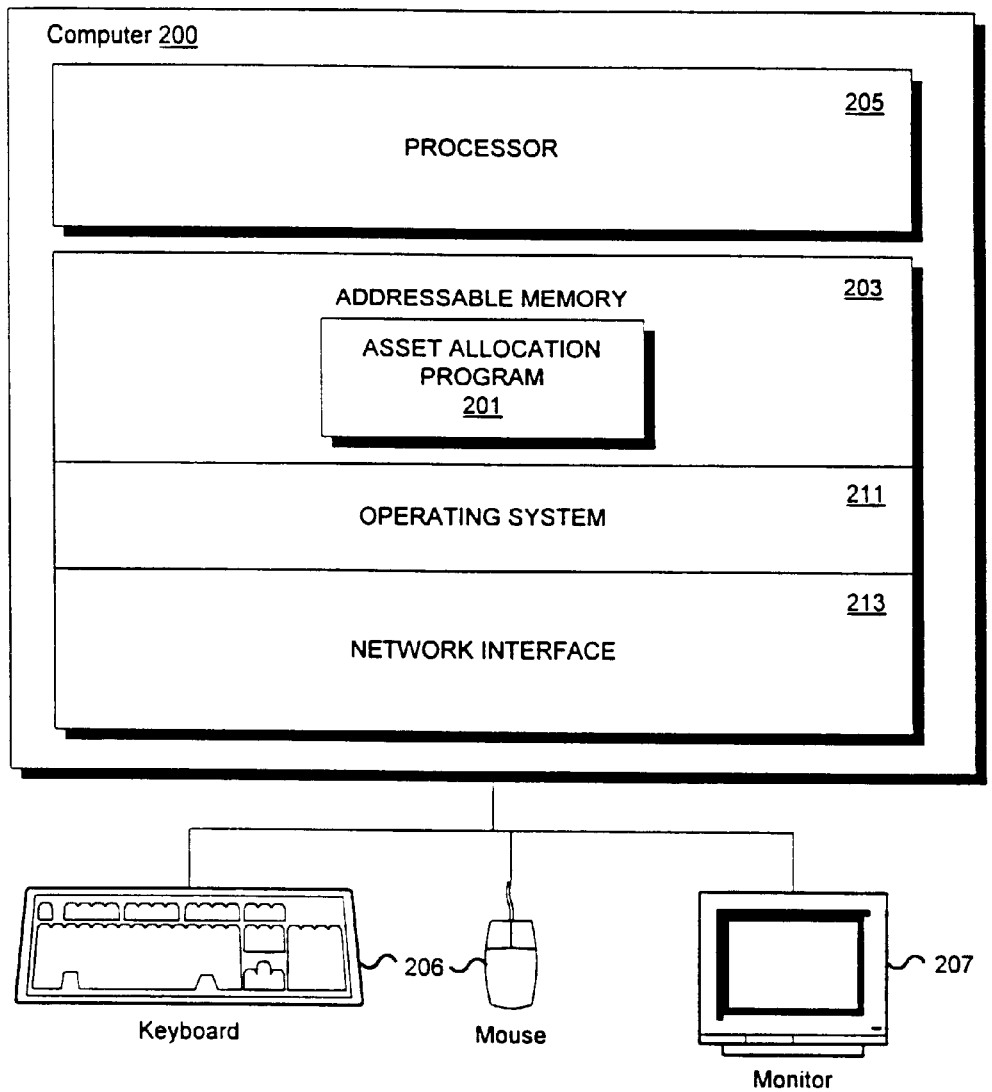
FIG. 4 is an illustration of a system in accordance with the present invention.

Referring now to FIG. 4, there is shown the configuration of a computer system in accordance with one embodiment of the present invention. The computer system environment is generally a conventional computer system that has been configured by one or more software products to operate in accordance with the methods of the present invention, to determine and provide the allocation of investment assets to investments in a portfolio, and to output and display various user interfaces enabling the user to operate and control the system and software product.

Computer system 200 accordingly includes an addressable memory 203, and a processor 205, along with conventional input 206 (e.g. keyboard and mouse) and output (e.g. display and printers) devices 207, communication links and hard disk or other mass storage unit. The processor 205 is conventional, and executes software stored in the memory 203. The computer system 200 may be implemented with conventional hardware, such as an IBM compatible, Intel Pentium® based computer. The memory 203 stores a conventional operating system 211, such as Microsoft Corp.'s Windows 3.1 or Windows95. Also provided is a conventional network interface 213 for accessing public communications networks, such as the Internet.

Figure 5:
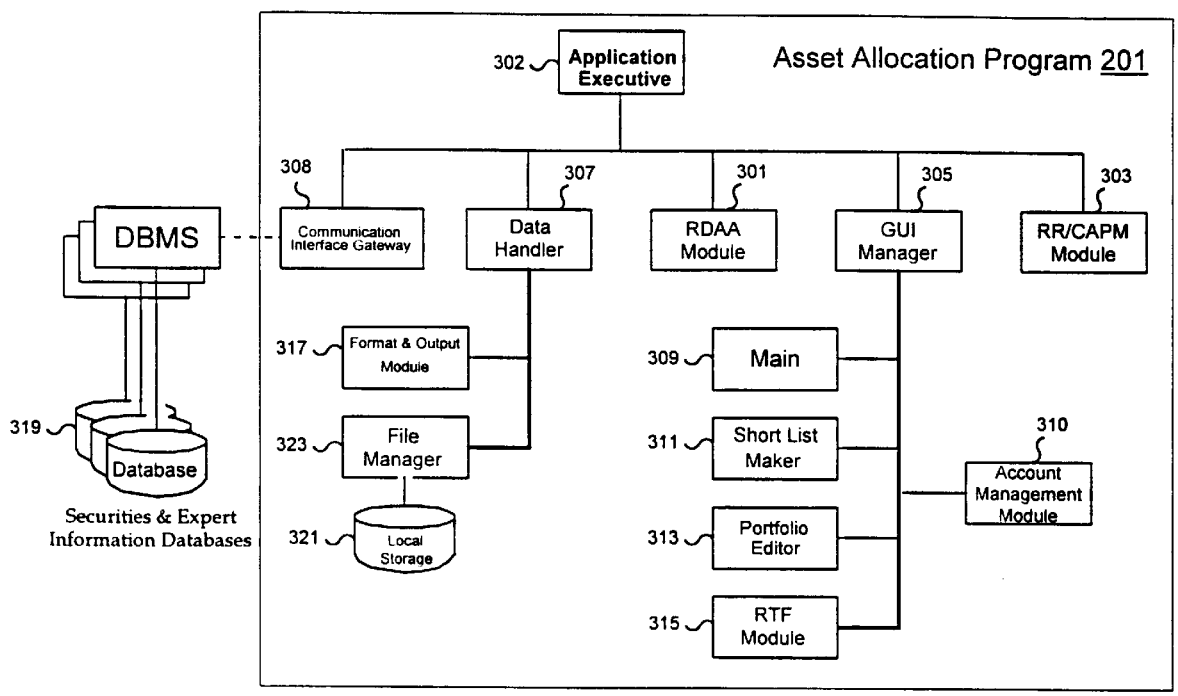
FIG. 5 is an illustration of the software architecture of the asset allocation program of the present invention.

Loaded into and executing from the memory 203 are components of an asset allocation program 201 in accordance with an embodiment of the present invention. Referring now to FIG. 5, the asset allocation program 201 includes an RDAA module 301, a GUI manager 305, a data handler module 307, and a communications interface gateway 308. An optional RR/CAPM module 303 may also be included. The GUI manager 305 includes a main module 309, a short list maker module 311, a portfolio editor module 313, an RTF module 315, and an account management module 310. An application executive 302 controls over all operation flow and preserves system state data.

5.1.1 Main Module

The main module 309 of the GUI manager 305 provides direct and arbitrary access to the four other user interface modules. The main module 309 provides for logon/off, and security password management to secure an investor's account data from unauthorized users. The main module 309 also allows the investor to select or nominate a current short list of investments or a portfolio for analysis by the RDAA and RR/CAPM modules 301, 303. Once the investor has logged on and selected a portfolio, the main module 309 allows arbitrary access to the other components of the system for conducting analysis of the selected portfolio.

5.1.2 RTF Module

The RTF module 315 manages an interactive dialogue with the investor to construct or edit the investor's risk tolerance function. Once the risk tolerance function is established, it is labeled, stored, and may be repeatedly accessed by the other system components. The RTF module 315 supports the following functionality:

Launch and execute interactive dialogue of reference gambles to define a new RTF.

Select and retrieve an existing RTF as working candidate.

Launch and label new working candidate RTF.

Input/edit $A_D$ 'despair', $A_H$ 'contentment', and current net asset $A_T$ amounts.

Performs both sanity and verification checks on the shape and stability of a new RTF.

Display working candidate RTF graphically.

Select multiple RTFs for comparison and display.

Request and execute RTF verification procedure by generating a series of inferred reference gamble decisions from the nominated or working candidate RTF.

Label, store/discard working selected RTF.

Nominate a stored RTF as current RTF for use by RDAA and RR/CAPM modules.

5.1.3 Short List Maker Module

The short list maker module 311 provides for selection of a number of investments for inclusion in a short list of investments to be analyzed by the RDAA or RR/CAPM modules 301, 303. In this disclosure, "investment assets" includes cash (own or borrowed) and other liquid assets that may be invested by an investor. "Investments" includes stocks, bonds, commodities, precious metals, and any other securities or financial instruments in which an investor may invest. The short list maker 311 provides the following functionality:

Establish a connection with a third party securities data service and database 319 for searching for investments.

View, nominate, and edit selection criteria for selecting an investment.

Select a current short list (SL) of investments or portfolio for analysis.

Display graphical and data tables for each candidate investment.

Access expert advice services 319 via the communications interface gateway 308.

Compute risk correlation matrix for all investments in current short list and display.

Display, edit, and/or nominate current short list of investments as new short list.

Label and store new short list and/or nominate as the current short list.

5.1.4 Portfolio Editor Module

The portfolio editor module 313 provides for selection and editing of a portfolio of investments. The portfolio editor module 313 provides the following functionality:

Select a current (default) or stored portfolio for editing.

Elect to include/exclude data for currently owned investments from an actual portfolio into the current portfolio.

Generate/edit the financial factors scenario.

Select financial factors scenario as the current scenario.

Edit limits from existing or provided default values.

Command RDAA reoptimization of current portfolio.

Edit all input amounts within specified limits.

Label/store or discard current portfolio.

Command generation of list of current buy/sell orders from the current and actual portfolios.

5.1.5 RDAA & RR/CAPM Modules

The RDAA module 301 and RR/CAPM modules 303 implement the analysis and optimization of an investor's investment allocation as set forth above with respect to (13) and (14) above, and as further explained below in §5.6. The GUI Manager 305 is responsible for presenting the outputs of the RR/CAPM and RDAA modules on the display 207 using the user interfaces of the present invention, as variously described below with respect to FIGS. 7–10, and for obtaining user inputs for controlling the application.

5.1.6 Account Management Module

The account management module 310 provides a user interface to one or more online investment systems, such as a brokerage house to access and update an investor's account. The account management module 310 retrieves and displays securities data, corporate financials, market performance data and other research information. The account management module 310 also provides for individual trades in the investor's accounts, and transfers the list of current buy/sell order to the investor's investment account for execution.

5.1.7 Data Handler Module

The data handler module 307 includes a format and output module 317 and a file manager module 323 which communicates with a local file storage system 321. The data handler 307 manages formatting and outputting of data to the input and output devices, and retrieval and storage of data to the local file storage system 321.

5.1.8 Communications Interface Gateway

The communications interface gateway 308 provides an interface to external databases containing securities data, such as corporate financial data, industry performance, securities price and performance data, investment advisor opinions and consensus ratings, and the like, including, in some versions, more comprehensive portfolio management services without the portfolio analysis and optimization functions as provided by the present invention, as commonly available from brokerage houses, investment firms, and other sources.

5.2 The System State

The asset allocation program 201 is 'stateful system' in that its internal data representation consists of a formal list of data structures and related status parameters having current values. The asset allocation program 201 performs certain functions and processes automatically and in response to user input depending on the current state of the system. The following is a list of 'state variables' that are stored by the asset allocation program 201:

Current RTF: the investor's RTF that is used to calculate the optimized allocation of a given set of investment assets.

Current Short List (SL) Nominations: a set of N investments selected by the investor for optimized allocation.

Current Short List Performance: for each of the investments on the Current Short List, predicted performance parameters including a covariance matrix of market performance data.

Current Actual Portfolio: a set of investments currently held by the investor, including for each investment, a label, purchase price, purchase date, current price.

Current Allocation Constraints: investor specified limits on the percentages or dollar amounts of the investor's investment assets to be allocated to various ones or groups of investments including a Value at Risk constraint that applies to the overall portfolio.

Current Market Prediction: an estimate of market return, for example, one based on a benchmark market index, such as the S&P 500 or the Dow Jones Industrial Average.

Investment Horizon, Market Appreciation and Standard Deviation: the Investment Horizon defines the length of time for the investment; Market Appreciation is an estimate of the annualized return during the Investment Horizon; and Standard Deviation is the standard deviation of market returns.

Current Rates: loads on individual investments, management load, tax rate, and borrowing rate.

Current Computed Portfolio: Origin—Optimized, User Input, Proportionally Recalculated. Invested own fluids amount, security labels, security amounts & portfolio fractions, borrowed amount, expected return amount and standard deviation.

5.3 System Operation: Standard User Sequence

Figure 6:
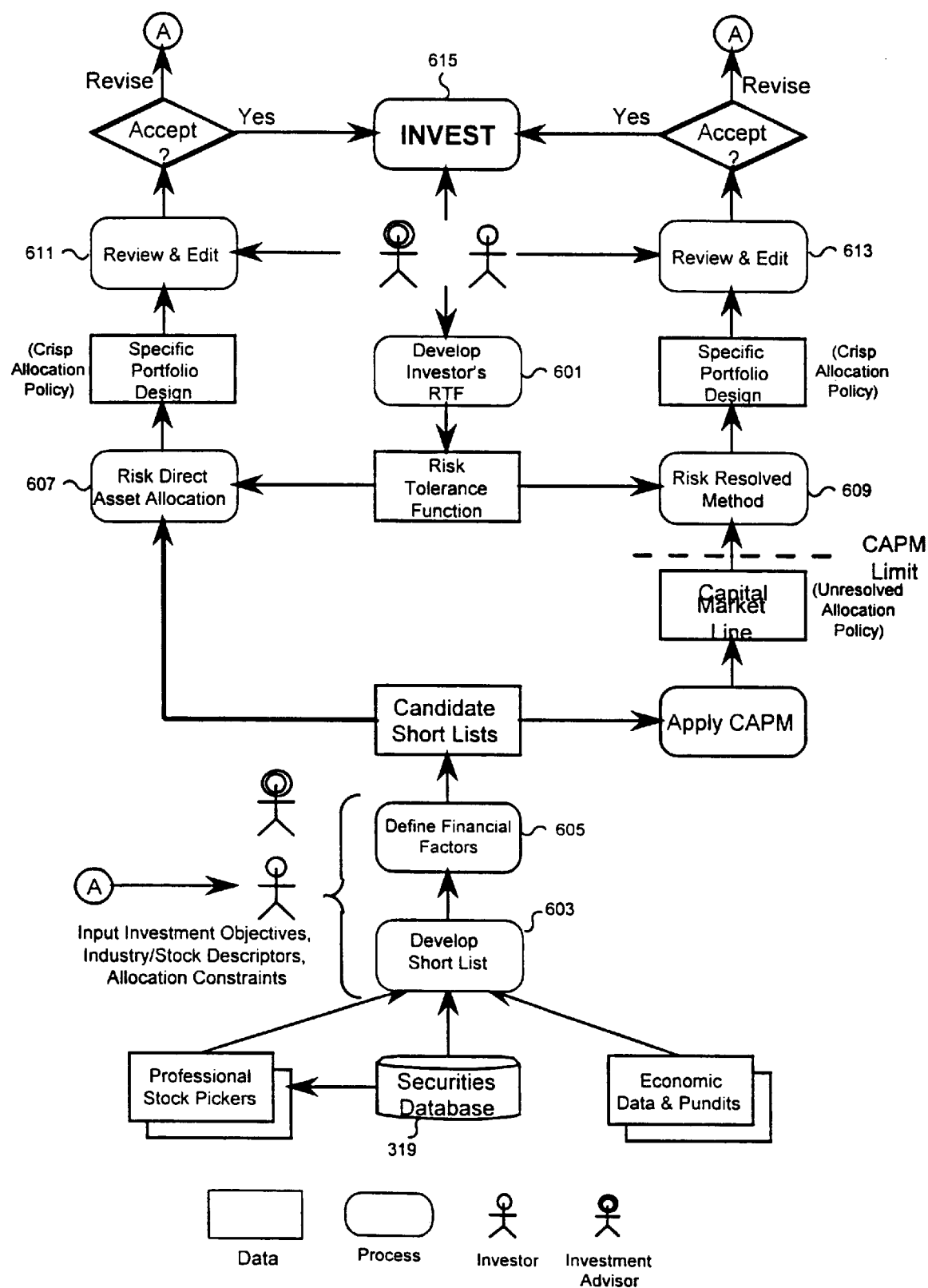
FIG. 6 is an illustration of the overall data and process flow in accordance with the present invention.

Referring now to FIG. 6 there is shown an overall process flow of the operation of the asset allocation program 201. The process flow described herein is exemplary of a useful process flow with the system configuration outlined above. However, the system may be operated and configured in any of a number of ways to satisfy licensee requirements for their intended markets (e.g. consumer, institutional, commercial) and need not have both the risk direct and risk resolved loops.

5.3.1 Generate/Update RTF

Prior to any optimization of a portfolio, the investor creates 601 at least one RTF to define his risk preferences using the RTF module 315. Once generated the RTF is stored and accessed as needed by the RDAA and RR/CAPM modules. The investor may review and update his RTF at any time, periodically or when a financially significant event has occurred. The process of creating the investor's RTF is further described below in §5.4.

5.3.2 Generate/Retrieve Short List

Independently of establishing an RTF, the investor selects 603 a short list of candidate investments for optimization by the RDAA or RR/CAPM modules. Selection is performed via the short list maker module 311. The short list may be derived through any of a number of ways including direct input of recommended securities from experts' lists, investment advisors, or any other source. The investor may generate any number of alternate short lists, which can be individually labeled and stored for later retrieval.

For each short list, the investor specifies predicted future performance data for each investment asset. The future performance data may be the alpha, beta, sigma, R2, and cross correlations related to the Efficient Market Hypothesis approach or derived from any other predictive theory, including estimates that may by available in the securities database 319, information from investment advisors, or inputs which just reflect the investor's own assessments of the future performance of the investments. Regardless of the Market Hypothesis used, the short list maker module 311 computes and updates a covariance matrix for the short list.

5.3.3 Generate/Retrieve Financial Factors Scenario

The investor specifies 605 a scenario of financial factors that will be used to define the optimization requirements. The scenario is input and edited by the user via portfolio editor module 313. The investor inputs values for the following:

Representative epoch for securities (and market). These values define the time period over which the optimization of investment asset allocation is to be computed, and compared with market performance over the same period.

Input/edit current actual portfolio. Here the investor identifies the investments to be included in the optimization, preferably by security label, and including purchase price, purchase date, current price. The price information may be accessed and provided by the account management module 310.

Current market prediction data, including the Investment Horizon, Market Appreciation, and Standard Deviation data. Again, this data need not be manually input by the investor, but may be extracted from existing online sources via the account management module 310.

Where individual securities are already known, the investor may input current loads on individual securities, and the investor imposed contraints on each short list candidate, owned stocks, invested, loaned (risk free), and borrowed amounts, Value at Risk. It also includes the buy/sell and portfolio management fees, tax rates, and purchase cost, etc. of owned stocks. Specifically for the stocks it includes the alfas, betas, sigmas, correlation coefficients, valid data epochs (may be different for each stock), for the stocks and the market predictions from FIG. 8.

Finally, the investor labels the Financial Factors Scenario for storage and later retrieval.

5.3.4 Generate Optimized Portfolio

The investor generates 607, 609 an optimized allocation of investment assets for the current short list, including owned securities, of investment assets, using the RDAA module 301 and for the RR/CAPM module 303. The optimized allocation specifies the dollar amount to be invested in each of the short list investments to achieve the optimized risk reduced investment return. To initiate the optimization, the investor selects a current short list and its related Financial Factors Scenario, and one of the optimization modules 301, 303. The selected module verifies that a complete dataset exists for portfolio computation. The optimization module then computes and outputs for display the newly computed investment allocation. The computed investment allocation, and accompanying short list and financial factors is labeled and stored for later retrieval and if desired, editing. If the short list or financial factors scenario changes, then the investment allocation needs to be recomputed.

5.3.5 Edit & Review Computer Portfolio

Once an investment allocation for a portfolio is computed, the investor may review and edit 611, 613 any of the variables defining the portfolio using the portfolio editor module 313. The investor selects either the current portfolio for editing or a stored portfolio for retrieval. The following variables may then be edited:

Input data on any original short list member (whether included in portfolio or not).

Edit short list securities' investment constraints and/or amounts.

Edit own investment assets constraints and/or amount.

Specify of new candidate investments for the short list, including obtaining new candidate investment performance statistics, testing a new candidate investment in the current portfolio design; launching a query into the securities database 319 to find specified investment candidates; or launching an agent into Internet to find a specified candidate.

Edit borrowed investment asset constraints and/or amount.

Interrogate predicted portfolio performance through editing portfolio return confidence intervals.

Edit securities' predicted performance parameters.

Following editing, the investor then commands recomputation or reoptimization of the portfolio to produce a revised computed portfolio which itself may be further edited or discarded or labeled and stored.

5.3.6 Access Brokerage Services

With one of the computed portfolios, the investor then accesses his online investment account via the account management module 310. The account management module 310 automatically compares the current actual portfolio with the newly generated portfolio, generates an editable buy/sell table which, upon execution 615, changes the investor's actual portfolio to match the computed portfolio. Depending on the facility of the online brokerage service, the investor may issue a comprehensive buy/sell order or use the generated buy/sell table to place the individual orders as allowed by the service and obtain an updated actual portfolio.

5.4 User Interface Features

In the form of annotated screen designs in selected figures, the present invention provides a number of new user interfaces for editing and understanding the performance and risk characteristics of a given portfolio. The user interface displays are as follows:

5.4.1 Portfolio Design

Figure 7:
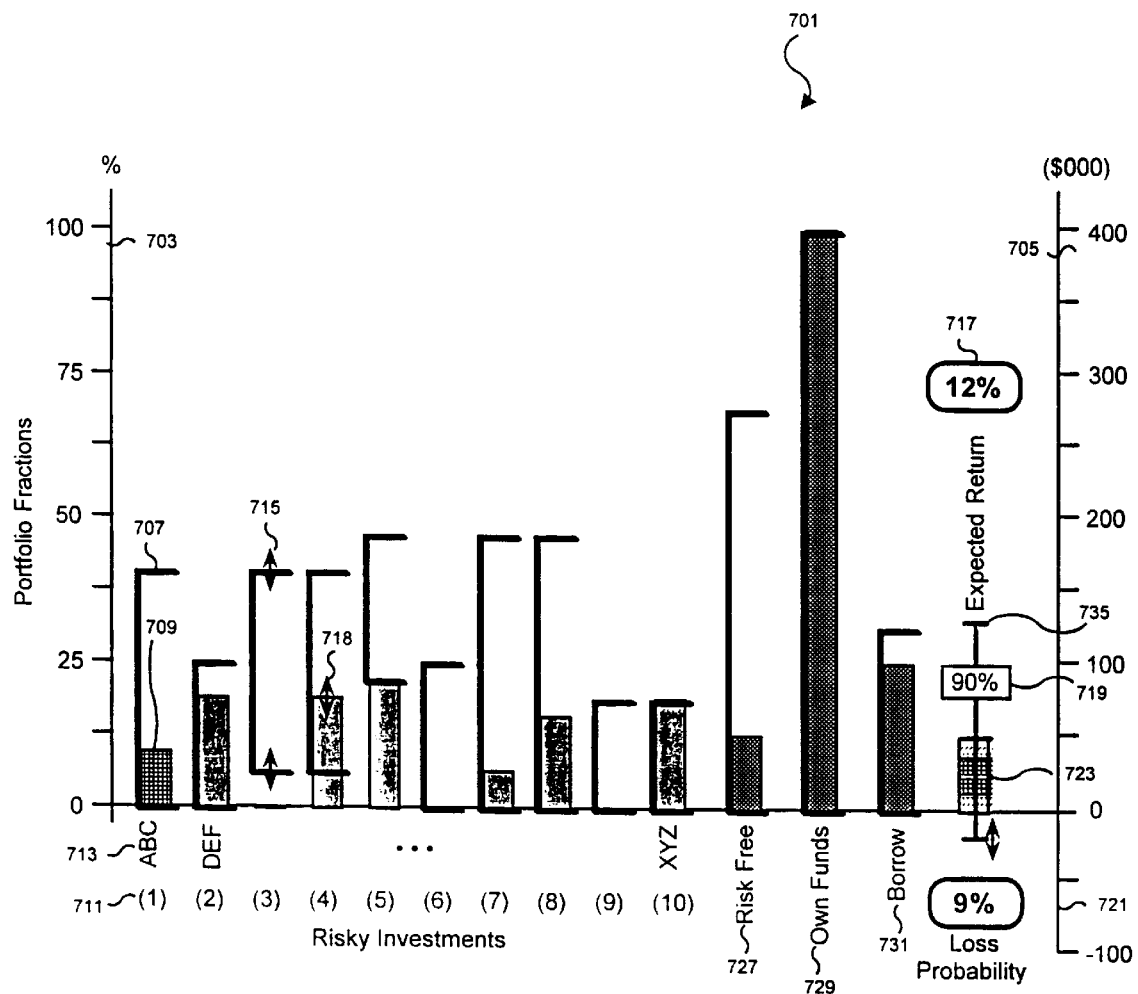
FIG. 7 is an illustration of primary graphical output from the main user interface of the asset allocation program.

Referring now to FIG. 7, there is shown an example of an interactive user interface which provides for the primary output of the asset allocation program 201. The portfolio design screen 701 summarizes what investment funds are invested (own 729 and new SL candidates (2–10)), under what constraints they are to be allocated (the bold brackets 707), the actual monetary amounts which the RDAA module 301 or RR/CAPM module 303 allocated to the risky and risk free vehicles (ten securities are shown with their ticker labels 713 indicated along with the risk free amounts 727), and finally the risk compensated portfolio's predicted performance 717. Additional data, such as the computed PP value of the current design and dollar amounts may also be included.

The portfolio design screen 701 is constructed as follows. Along the X-axis are listed each of the investments 711 included in the computed portfolio, each investment listed by its corresponding label 713. Also listed are columns representing risk free funds 727, the investor's total available own investment funds 729, and borrowed investment finds 731. For each of the investments 711, a monetary amount invested in the investment is shown in bar format as a bar 709 with respect to two Y-axis scales. A first Y-axis 703 is scaled as percentages of the investor's total investment funds (equal to the investor's own funds 729 and the borrowed funds 731). A second Y-axis 705 is scaled in currency amounts. Thus for each investment 711 or investment funds 727, 729, 731, the amount to be invested according to the RDAA module 301 is directly shown.

The portfolio's predicted performance is displayed by the rightmost bar 723 and bracket 735. The height of the bar 723 indicates the expected cash return during the investment period; the percent return 717 is also indicated as a percentage of the investment funds. The bracket 735 displays the symmetrical performance uncertainty within a confidence window 719 into which the portfolio's return will fall. In this example, the optimized portfolio will yield an expected return of 12% and with 90% certainty the portfolio's return will fall between a maximum of about 35% and a minimum of about 5%. The overall likelihood of having a negative return (i.e. losing money) is the indicated 9%.

Accompanying each bar 709 is a constraint bracket 707. The upper and lower handles of the constraint bracket 707 are adjustable by the investor (as shown by arrows 715) via the mouse 206 to define the maximum and minimum percentages 703 or amounts 705 to invest (left Y-axis 703) and the absolute monetary amounts and or limits (right Y-axis 705) of own and borrowed investment funds to invest. Likewise, the actual investment amount 709 is also adjustable by the investor as shown by arrows 718. When the investor adjusts such an amount directly, the algorithm takes that as an equality constraint, essentially collapsing the maximum and minimum brackets to the indicated amount, and computes the optimum within the remaining degrees of freedom on other portfolio parameters. Proceeding in this manner, the investor adjusts the constraint brackets 707 and/or the bar 709 for the individual investments 711 and funds 727, 729, 731 to define a particular financial factors scenario. When these inputs are complete, then RDAA module 301 is commanded to recompute and display the optimal portfolio.

The portfolio design screen 701 may also be assymetrically defined by moving the appropriate crossbar and the display will dynamically update the optimal portfolio solution with the new confidence probability. The lower rounded box 721 always indicates the probability (here 9%) that the portfolio will result in actual reduction of investor's current investment funds. The upper rounded box 717 always indicates the expected portfolio return (here 12%) under the current portfolio design and input financial factors scenario.

From this display 701 the investor may now begin to examine the sensitivity of a given portfolio's risk and return by reconstituting the investment and invested amounts by appropriately changing the size of the bars 709 and constraint brackets 707 on the display 701. In response to an adjustment, the asset allocation program 201 dynamically recomputes the portfolio's performance and continuously updates the display 701. If the investor exactly specifies all invested amounts, then the use of such forced inputs directly calculates the resulting monetary utility PP and does not require numerical optimization. Such a responsive display gives the investor unparalleled insight about how the portfolio responds to different allocation policies. In the final analysis the investor may, of course, opt for a slightly non-optimal portfolio that may satisfy some other non-quantifiable subjective criteria which still produces an acceptable return and risk which he naturally intuits (and has corroborated by the updated PP value display). It should be noted that, the RDAA solution is still optimum within the investor imposed constraints. It should be clear that the less constraints the investor imposes, the higher the PP value (monetary utility) the RDAA module 301 is able to obtain from its optimization. Investor constraints simply reduce the possible maximum PP value.

5.4.2 Multiple $R_M$ integration

Figure 8:
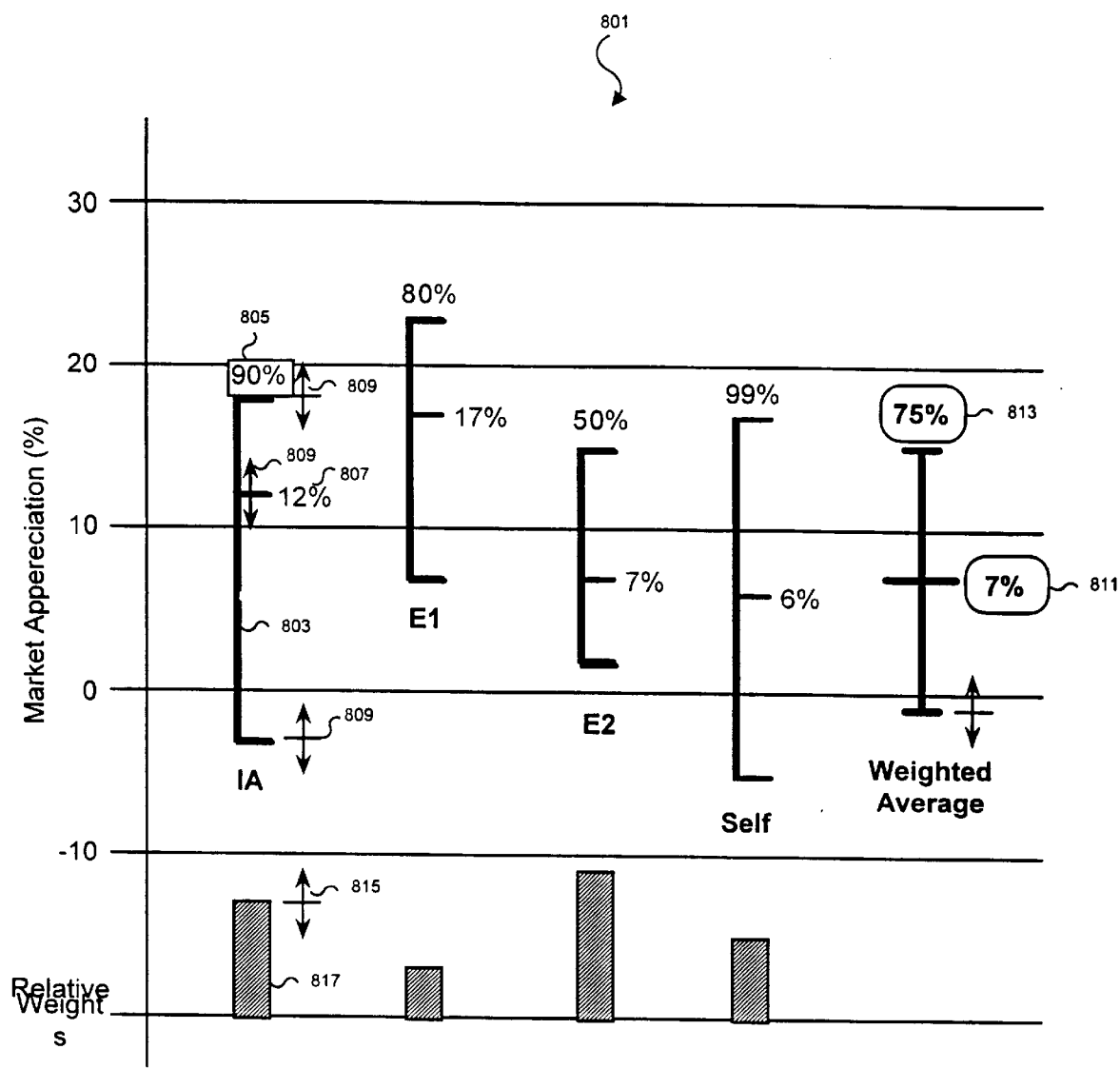
FIG. 8 is an illustration of a user interface for interactively editing competing scenarios of future market performance.

Referring now to FIG. 8 there is shown an example screen display 801 for interactively inputting and editing four competing predictions of future market performance given by, for example, an Investment Advisor (indicated as IA), two expert sources (E1, E2), and the investor (Self). The predictions are given in the bracket formats usually obtainable from the investment information sources, such as securities database 319. Each bracket 803 has an associated confidence percentage 805 which represents the probability that the actual market return 807 will be in the indicated interval, and may or may not have an indicated mean 811 and average confidence percentage 813. The investor is able to make the adjustments where indicated by the up/down arrows 809; he may also type in the amounts by selecting the on-screen number (e.g. percentage 805, return 807) which is then boxed as shown for the IA. Lastly, the investor can adjust a relative weight 817 for each input by moving the top of each weighting bar 817 as indicated by arrows 815.

The asset allocation program 201 responds by dynamically recomputing and continuously updating the display of the "Weighted Average" market response 811. The investor may also individually move either end bar to obtain the display of the probability that the composite market return falls in the indicated window. The RDAA and RR/CAPM modules may then be commanded to use the recomputed average and its related standard deviation to recalculate the optimal investment allocations for any selected portfolio.

The final market prediction may be deleted, and/or named and saved for further use as part of the current financial factors scenario. From this part of the application it will also be possible to recall other such screens of previously developed market performance predictions and nominate them for further use.

5.4.3 Competing Portfolios as a Function of $R_M$ and Relative Performance of Portfolios under Different Market Performance Futures.

Figure 9:
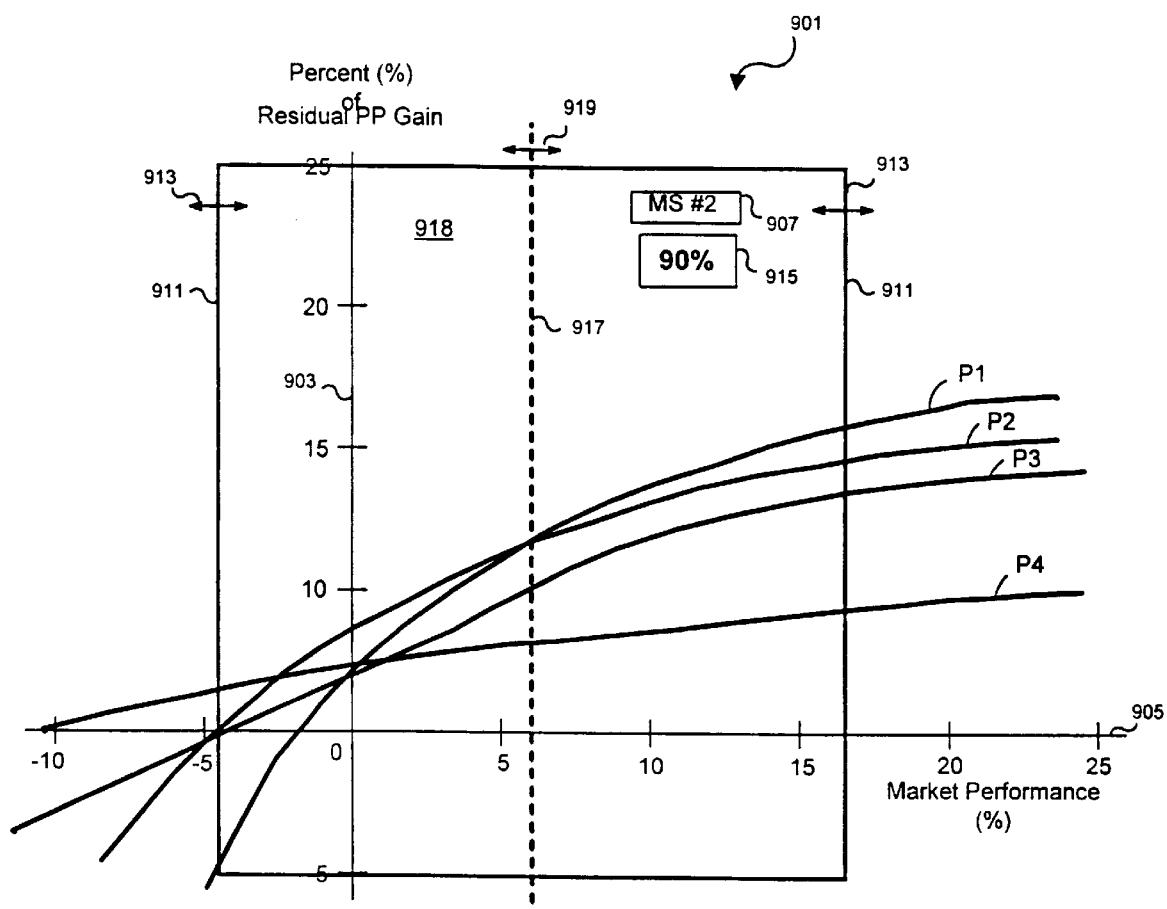
FIG. 9 is an illustration of a user interface for interactively generating and comparing multiple portfolio designs under uniform market conditions.

Since the asset allocation program 201 permits the investor to generate and store several portfolio designs (both optimal and sub-optimal) as described above, it is important to provide him an opportunity to compare the relative performance under uniform market conditions. FIG. 9 illustrates an interactive screen 901 for performing this task.

In this screen display 901, for each of several investor selected portfolios P1, P2, P3, and P4, the performance 903 of that portfolio is plotted against the investor's residual PP value as a function of expected market performance 917 (holding standard deviation constant) at the investment horizon. The vertical axis 903 is scaled in the percent of PP remaining (i.e. 1−PP($A_T$) which is a meaningful comparator to the investor since it is indexed from his current asset ($A_T$) level. The horizontal axis 905 is scaled to expected percent market returns.

The downward shape of the curves P1–P4 indicates that the investor is in the risk averse part of his RTF since the marginal PP gain drops for every additional increment of market return. Generally it is clear that Px is better than Py if and only if Px>=Py over the range of anticipated market performance, however FIG. 9 has no such pair of curves. Rather, FIG. 9 shows the more realistic and difficult situation where some portfolios, eg. P1 and P2, do well with high market performance values but do poorly faster when the market goes down (holding the standard deviation constant) as compared to P3 and P4. Portfolio designs P3 and P4 may be considered more 'defensive' and therefore reasonable if there is a significant likelihood of poor market performance. However, the RDAA or RR/CAPM modules already account for any given market performance p.d.f., and thus FIG. 9 shows only the sensitivity to variation in the mean value.

The investor may select a prestored market scenario 907 (here MS#2) from a pull down list from the indicated label. The investor then modifies the shaded confidence boundaries 911 of the confidence interval 918 as indicated by the left/right arrows 913 to define a new confidence interval 918 for the market performance until the investment horizon. The asset allocation program 201 immediately displays the confidence level 915 (here 90%) that the current market scenario return will fall within the new shaded area.

Finally, the investor can view dynamically updated portfolio performance curves Pi by changing the mode of this display to accept as input dragging the expected market return line 917 to a new value (as shown by arrows 919) and adjusting the now symmetrical width of the confidence interval 918 to the confidence level that reflects the new uncertainty in the market's performance. This dynamic, interactive display again provides novel and valuable insight to the sensitivity of the performance comparisons for the competing portfolios.

5.4.4 Correlation Matrix

Figure 10:
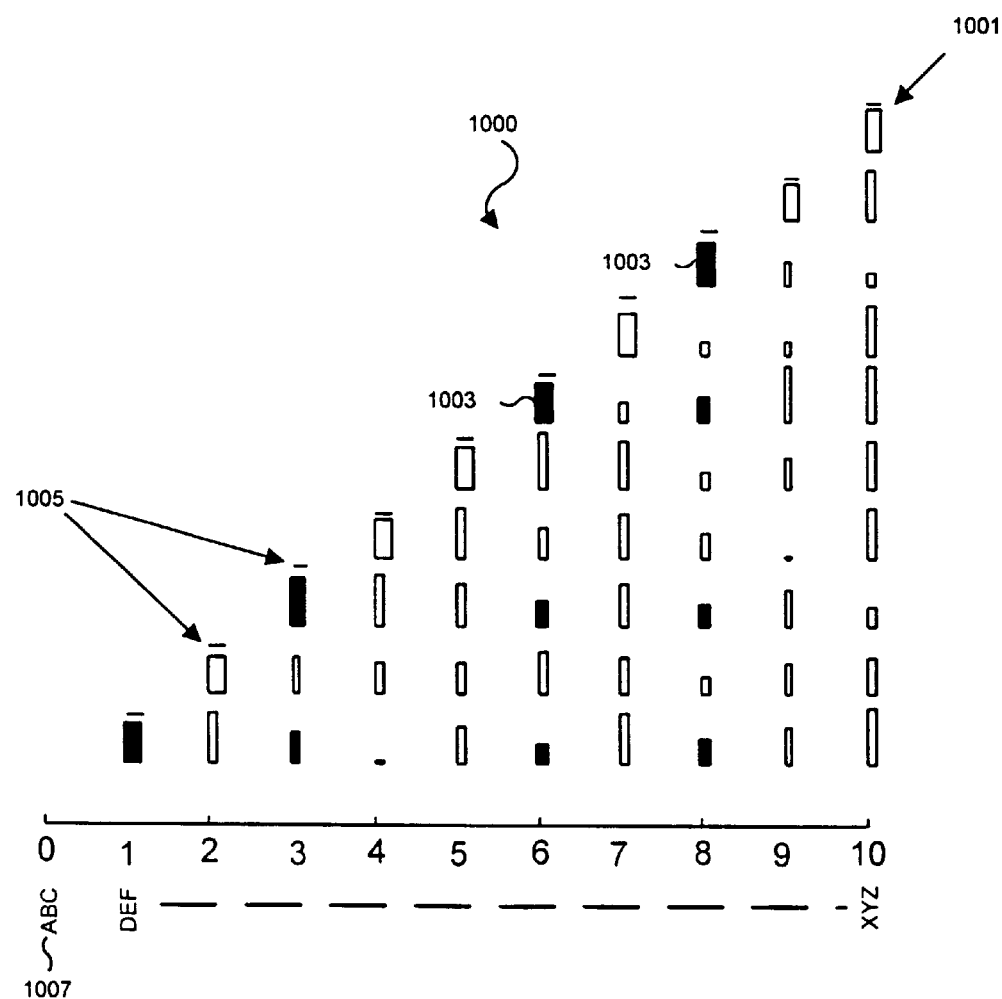
FIG. 10 is an illustration of a user interface showing a reformatted correlation matrix and related risk adjusted returns for a selected list of candidate securities.

Referring now to FIG. 10 there is shown another screen display 1000 of the present invention, this one representing a modified correlation matrix of risk adjusted returns for a portfolio of candidate securities. The risk adjusted returns may be conventionally calculated; the present invention here provides a new and more insightful way of understanding the standard correlation matrix.

In FIG. 10, the risk adjusted returns—expected return divided by the standard deviation—for each investment 1007 as shown on the main diagonal 1001 as varying height rectangular boxes 1003, and the correlation coefficients for all pairs of securities are shown at the intersecting off-diagonals.

The lines 1005 above the wider rectangles of the risk adjusted returns indicate the marginal returns available if the predicted market appreciation were perfectly known—i.e. if $\sigma_M = 0$—and therefore quantify the decrements due to market uncertainty as another function of our ignorance of the future. The returns and intersecting correlation coefficients of the investments selected are displayed by the filled rectangles with the rejected investments indicated as outlined rectangles.

In the asset allocation program 201, this screen display 1000 enables the investor/analyst to quickly get the 'feel' for how RDAA module 301 determines portfolio membership. This feedback is valuable to the investor as he adds new investments to a portfolio that might provide additional diversification benefits. From the figure we notice that the selected investments (Nos. 1, 3, 6 and 8) all have relatively high risk adjusted gains and low cross correlation values. The largest sum is invested in security #8 which itself is unique in the short list because it has an almost uniformly low performance correlation with all the other stocks thereby providing the most diversification value in its inclusion.

5.5 RTF Module

As described above, the RTF module 315 is responsible for providing an interactive dialogue to establish (abstract and quantify) an investor's risk tolerance function (or multiple functions). The RTF module 315 provides the interactive dialog in terms of 50/50 reference gambles, detects and filters inflections above/below the EMV line, and creates an RTF either by appropriate candidate analytical functions and/or splines.

Table 1 presents the nominal sequence of reference gambles that the investor is asked to resolve to obtain the points in the A–PP space defined over the total assets line by the investor's $A_D$, $A_T$, $A_H$ values. It is these captured points $\{X_i, PP(X_i)\}$ which are used to fit the analytical RTF in either single function regression or in cubic spline format. Here the X refers to the cash amounts used in the reference gambles. The RTF module 315 begins by accepting investor inputs of their $A_D$, $A_H$, and $A_T$ amounts.

TABLE 1

Sequential Capture of Risk Tolerance Function Points

| RG # | $ High | PP(High) | $ Low | PP(Low) | $X (input) | PP(X) |
|---|---|---|---|---|---|---|
| 1 | $A_H$ | 1.0 | $A_D$ | 0 | $X_1$ | 0.5 |
| 2 | $X_1$ | 0.5 | $A_D$ | 0 | $X_2$ | 0.25 |
| 3 | $A_H$ | 1.0 | $X_1$ | 0.5 | $X_3$ | 0.75 |
| 4 | $A_H$ | 1.0 | $X_3$ | 0.75 | $X_4$ | 0.875 |
| 5 | $X_3$ | 0.75 | $X_1$ | 0.5 | $X_5$ | 0.625 |
| 6 | $X_1$ | 0.5 | $X_2$ | 0.25 | $X_6$ | 0.375 |
| 7 | $X_2$ | 0.25 | $A_D$ | 0 | $X_7$ | 0.125 |

Table 1 is explained as follows. At the start the investor is presented with a choice of 1) taking a certain, perhaps negative, $X_1$, thus making his total assets $A_T + X_1$, or 2) choosing a 50/50 gamble (i.e. toss of fair coin) where winning yields ($A_H - A_T$) thus bringing his total asset to $A_H$. Losing the gamble results in a dollar loss of ($A_T - A_D$) thereby reducing the total assets to $A_D$. Starting with an arbitrary value, $X_1$ is increased if the gamble is chosen and decreased if the certain $X_1$ is chosen. (The process is speeded up if the initial $X_1$ is such as to keep $A_T + X_1$, near $A_T$.) In this manner the investor is quickly driven to the point of indifference or indecision, both indicating that the two alternatives are of equivalent preference. From the computation of the decision graph this becomes the (0.5, $A_T + X_1$ point on the RTF where $PP(A_T + X_1) = 0.5 = [0.5 \times 0 + 0.5 \times 1.0]$.

The $A_T + X_2 0.25$) point is determined by asking the investor to choose between 1) taking the certain, perhaps negative, amount $X_2$, thus making his total assets $A_T + X_1 + X_2$, or 2) choosing the 50/50 gamble where winning now yields $A_T + X_1 - X_2$ and losing yields a loss of $A_T + X_1 - A_D$ bringing his total asset to $A_D$. Again $X_2$ is raised if the gamble is chosen and vice versa thus bringing the investor to a point of equivalent preference between the presented alternatives. Since the best outcome now had a PP=0.5 (and the worst was, of course, $PP(A_D)=0$) from the first reference gamble, the current preference probability $PP(A_T + X_1 + X_2)$ is assigned the value $0.25 = [0.5 \times 0 + 0.5 \times 0.5]$.

We may now split the 0.5 to 1.0 PP interval to determine the ($A_T + X_1 + X_3$, 0.75) point by asking the investor to choose between 1) getting the certain amount $X_3$ added to his now total assets of $A_T + X_1$, or 2) taking a 50/50 gamble where winning will bring his total assets to $A_H$ and losing will maintain them at $A_T + X_1$. Again $X_3$ is raised if the gamble is chosen and vice versa until equivalent preference is reached. The value of $PP(A_T + X_1 + X_3)$ is $0.75 = [0.5 \times 1.0 + 0.5 \times 0.5]$.

In similar ways we may continue splitting the PP intervals until the points yield an unambiguously smooth track between (0, $A_D$) and (1, $A_H$). About four or five points are usually needed to accomplish this. During optimization a smooth analytical regression function is dynamically fitted to a subset of these points over the monetary 'region of activity' to yield the desired RTF that is used in the portfolio design methods below.

The present invention avoids the oft-cited circular logic (preference conflicts) and monetary relevance pitfalls of utility theory in such applications by presenting the reference gambles only within the investor's relevant monetary spectrum as described above, and by detecting 'insane' PP points and automatically reinterrogating that portion of the monetary axis until a 'sane' RTF is obtained. In practice this requires at most two passes. Insane PP points may be detected as RTFs having more than one inflection point.

That making monetary decisions, which are based on an individual's (or corporation's) RTF, is both a rational and practical approach is summarized from Behn and Vaupel [3] as:

1. Preference probabilities have a precise definition and can therefore be explained and captured unambiguously. Once $A_D$ and $A_H$ are given, the meaning of any mediating PP is clear. If, for example, an investor's RTF goes through the point PP=0.7 and $1,000,000, this states that the investor is indifferent between receiving $1,000,000 for certain and a gamble that will yield her $A_H$ with probability 0.7 or $A_D$ with probability 0.3. Even though both contingencies are hypothetical, the investor has been able to decide a priori that the value of the certain monetary outcome and the gamble are identical in her monetary spectrum.

2. Decision dilemmas can be readily resolved by assessing the PPs for each outcome and choosing the outcome with the highest PP. This is possible because each outcome can be replaced in the decision graph with its equivalent reference gamble. Applying the probability rules for computing the graph makes it clear that the investor will then prefer the decision which approaches the best outcome $A_H$, with the highest probability.

3. As an adjunct to the present development, the assignment of PPs to outcomes through reference gambles is applicable for all sorts of decisions "whether the consequences . . . are wealth, health, or happiness." Modern utility theory recommends that a decision maker can use PPs to assess the relative preference of each contemplated outcome.

To this list the present invention adds the important fourth reason in that such piecewise analytical expression of an investor's RTF over the monetary domain of interest makes possible the efficient application of the RR/CAPM and RDAA methods described herein. Prior to the development of this practical approach, monetary utility has been defined over arbitrary regions, such as zero to infinite dollars, disconnected from any actual investor, and consequently has experienced a controversial relationship to quantitative portfolio design only in academic discussions.

5.5.1 Example Interactive Dialogue for Capturing Risk Tolerance Function

Figure 11:
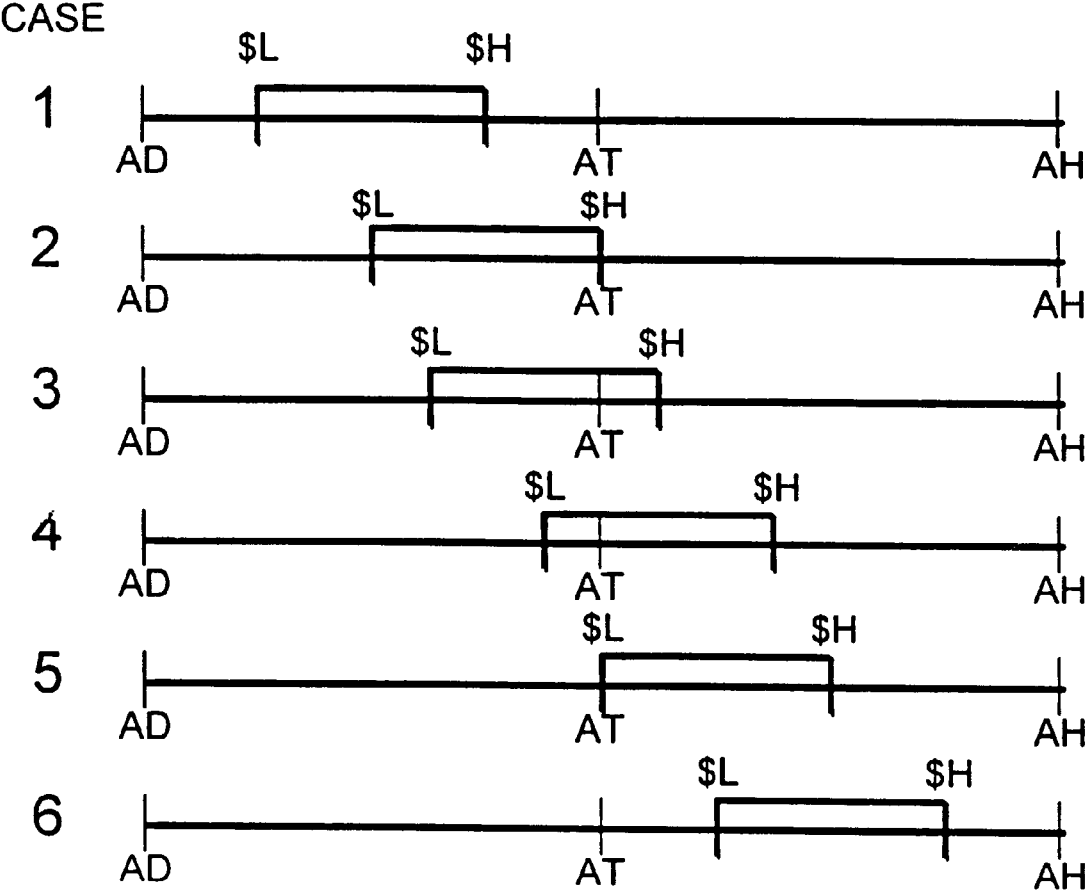
FIG. 11 is an illustration of risk tolerance cases for creating an investor's risk tolerance function.

In one implementation, the following cases are examples used by the RTF module 315 to define an investor's RTF. Their order of occurrence is somewhat arbitrary after the first reference gamble. Each case will have an intrinsic PP associated with it. Throughout we maintain $A_D \leq \$L < \$H \leq A_H$ and $A_D < A_T < A_H$. Each case X (X=1 . . . 6) continues offering the contingencies in paragraphs X.1 and X.2 under each case X described below until the investor branches to X.3 (indifference) at which time the next case in order is introduced. This process continues until all the specified cases are completed thus yielding a complete set of investor's RTF points. If the investor delays a long time (e.g. 30 seconds) before deciding (as described in the X.4 paragraphs), the RTF module 315 automatically suggests to the investor that he may have reached his indifference point and thus may be able to chose case X.3. The X-numbered cases are illustrated in FIG. 11. When each dialog is presented to the investor, all variables are instantiated and formulas computed to present the actual dollar amounts in the dialog itself. The questions which present the contingencies are merely exemplary, and other hypotheticals may certainly be used.

The first gamble always determines the PP=0.5 indifference dollar amount that will split the $A_D$ to $A_H$ interval. The subsequent gambles will continue splitting the so generated intervals iteratively while assigning the middle values of PP to the median indifference amounts as obtained from the cases below. It is clear then that the second gamble may be chosen to determine either the 0.25 or 0.75 PP points. These PP intervals may be further split in an arbitrary order. It is almost always the case that obtaining the cash amounts for the intervening PP points 0.5, 0.25, 0.125, 0.375, 0.75, 0.625, 0.875 is sufficient to determine the most complex RTF. The cases illustrated below cover the spectrum of possible reference gambles to obtain the dollar amounts to an arbitrary resolution of the RTF.

We note that such a detailed dialogue will most likely be used only by the new investor and that it will be replaced by direct manipulation of the monetary reference gambles for the experienced investor who will no longer need the type of 'introductory story line' presented below. The 'direct mode' will be selectable within the RTF module.

Case 1. (AD≦$L<$H<AT)

"You have been involved in an unfortunate lawsuit and the jury will certainly deliver one of two equally likely judgments against you if you do not agree settle the suit. The worst judgment requires you to pay the amount W=(AT−$L), and in the best outcome you must pay B=(AT−$H). The plaintiff's attorney offers to settle for the amount S=(AT−($L+$H)/2), would you pay the demand or go ahead with the jury trial?"

1.1 "PAY DEMAND"

"Before you reply the demand is peremptorily raised to S=(S+W)/2, would you pay this new amount?"

1.2 "JURY TRIAL"

"Before you reply the demand is peremptorily reduced to S=(S+B)/2, would you pay this new amount?"

1.3 "DON'T CARE or CAN'T DECIDE"

"Thank you. Now let's go on."The RTF module 315 records (AT−S) and its PP as a point on the investor's RTF.

1.4 Long Delay

"If it is difficult for you to decide, then you may have reached the point where you are indifferent to paying the demand or letting the matter go to trial. For estimating your tolerance to monetary risk this indicates that you indeed can't decide or don't care which path you take."

Case 2. (AD≦$L<AT) & ($H=AT)

"Your hillside house will suffer mudslide damage to the tune of W=(AT−$L) if you do not build an engineered retaining wall for the bid price of S=W/2. Reliable weather data for the coming season makes it equally likely that your house would be damaged or undamaged if you don't build the wall. Would you build the retaining wall?" (here B=0)

2.1 "BUILD WALL"

"Before you can reply to the bid the contractor notifies you that the cost of the wall has increased to S=(S+W)/2, would you still build the wall?"

2.2 "DON'T BUILD WALL"

"Before you can reply to the bid the contractor notifies you that the cost of the wall has been decreased to S=(S+B)/2, would you now build the wall?"

2.3 "DON'T CARE or CAN'T DECIDE"

"Thank you. Now let's go on."

Record (AT−S) and its PP.

2.4 Long Delay

"If it is difficult for you to decide, then you may have reached the cost point where you are indifferent to protecting your house or taking a chance with the weather. For estimating your tolerance to monetary risk this indicates that you indeed can't decide or don't care which path you take."

Case 3. $((AD \leq \$L < AT) \ \& \ (AT < \$H \leq AH)) \ \& \ ((AT-\$L) \geq (\$H-AT))$ "You paid W=(AT−$L) to enter into a speculative project which it now appears will reward you less than hoped for at best. In fact, it is equally likely that you may be able to sell out for a profit of B=($H−AT) or be stuck with the loss of W. A third party suddenly offers to buy your share for S=(W−X). Would you take the guaranteed amount from the third party or go ahead with the risky sale when (X=(AT−($L+$H)/2)?"

3.1 "ACCEPT BUY OUT"

"Before you can reply to the third party you are notified that the buy out price is reduced to S=S/2, would you still accept the buy out?"

3.2 "GO AHEAD WITH SALE"

"Before you can reply to the third party you are notified that the buy out price has been increased to S=(S+B)/2, would you still accept the buy out?"

3.3 "DON'T CARE or CAN'T DECIDE"

"Thank you. Now let's go on."

Record S and its PP.

3.4 Long Delay

"If it is difficult for you to decide, then you may have reached the cost point where you are indifferent to selling out your stake (or accepting a loss) for a certain amount, or taking a chance with the uncertain sale. For estimating your tolerance to monetary risk this could mean that you indeed can't decide or don't care which path you take."

Case 4. $((AD \leq \$L < AT) \ \& \ (AT < \$H \leq AH)) \ \& \ ((AT-\$L) \leq (\$H-AT))$ "You paid W=(AT−$L) to enter into a speculative project which it now appears may also reward you nothing. In fact, it is equally likely that you may be able to sell out for a profit of B=($H−AT) or be stuck with the loss of W. A third party suddenly offers to buy your share for S=(X−W). Would you take the guaranteed amount from the third party or go ahead with the risky sale when X=(−AT+($L+$H)/2)?"

4.1 "ACCEPT BUY OUT"

"Before you can reply to the third party you are notified that the buy out price is reduced to S=S/2, would you still accept the buy out?"

4.2 "GO AHEAD WITH SALE"

"Before you can reply to the third party you are notified that the buy out price has been increased to S=(S+B)/2, would you still accept the buy out?"

4.3 "DON'T CARE or CAN'T DECIDE"

"Thank you. Now let's go on."

Record S and its PP.

4.4 Long Delay

"If it is difficult for you to decide, then you may have reached the cost point where you are indifferent to selling out your stake for a certain amount or taking a chance with the uncertain sale. For estimating your tolerance to monetary risk this could mean that you indeed can't decide or don't care which path you take."

Case 5. $(\$L=AT) \ \& \ (AT<\$H \leq AH)$

"You are in a fortunate position of having the option to enter into a project that can net you either B=($H−AT) or at worst cost you nothing (W=0). In fact reliable odds are that either case is equally likely. The inevitable third party approaches and offers to buy your option for S=($H−AT)/2. Would you still go ahead with the project or sell your option?"

5.1 "ACCEPT BUY OUT"

"Before you can reply to the third party you are notified that the buy out price is reduced to S=S/2, would you still accept the buy out?"

5.2 "GO AHEAD WITH PROJECT"

"Before you can reply to the third party you are notified that the buy out price has been increased to S (S+B)/2, would you still accept the buy out?"

5.3 "DON'T CARE or CAN'T DECIDE"

"Thank you. Now let's go on."

Record S and its PP.

5.4 Lone Delay

"If it is difficult for you to decide, then you may have reached the cost point where you are indifferent to selling your option for a certain amount or taking a chance with the uncertain project. For estimating your tolerance to monetary risk this could mean that you indeed can't decide or don't care which path you take."

Case 6. $(AT \leq \$L) \ \& \ (\$H \leq AH)$

"You are in the most fortunate position of having the option to enter into a project that can net you either B=($H−AT) at best, or at worst still net you W=($L−AT). In fact reliable odds are that either case is equally likely. The inevitable third party approaches and offers to buy your option for S=(B+W)/2. Would you still go ahead with the project or sell your option?"

6.1 "ACCEPT BUY OUT"

"Before you can reply to the third party you are notified that the buy out price is reduced to S=(S+W)/2, would you still accept the buy out?"

6.2 "GO AHEAD WITH PROJECT"

"Before you can reply to the third party you are notified that the buy out price has been increased to S=(S+B)/2, would you still accept the buy out?"

6.3 "DON'T CARE or CAN'T DECIDE"

"Thank you. Now let's go on."

Record S and its PP.

6.4 Long Delay

"If it is difficult for you to decide, then you may have reached the cost point where you are indifferent to selling your option for a certain amount or taking a chance with the uncertain project. For estimating your tolerance to monetary risk this could mean that you indeed can't decide or don't care which path you take."

5.6 Implementation of Risk Resolved CAPM by the RR/CAPM Module

Figure 1:
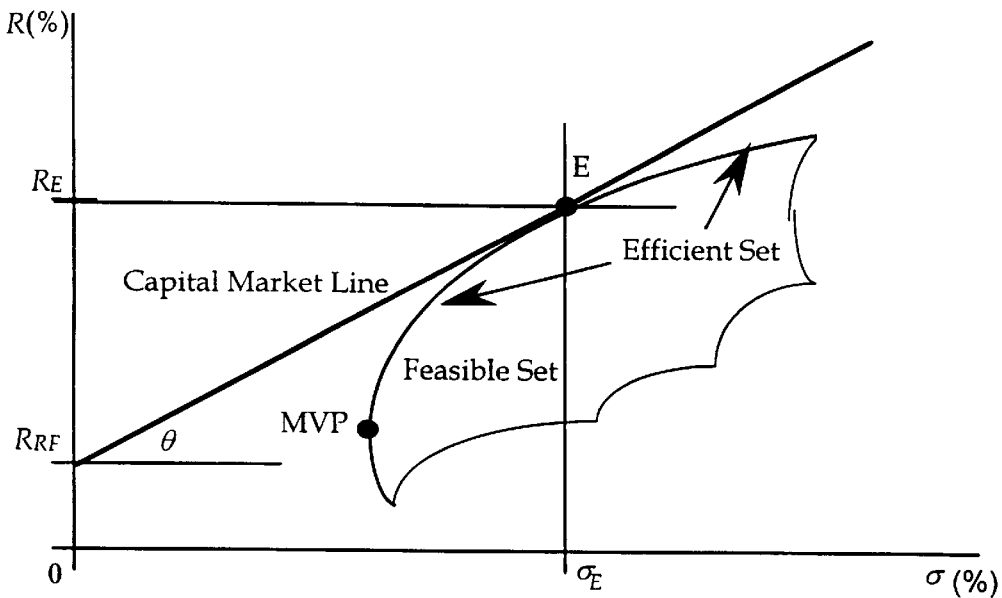
FIG. 1 is an illustration of the efficient frontier and Capital Market Line in the CAPM.
Figure 2:
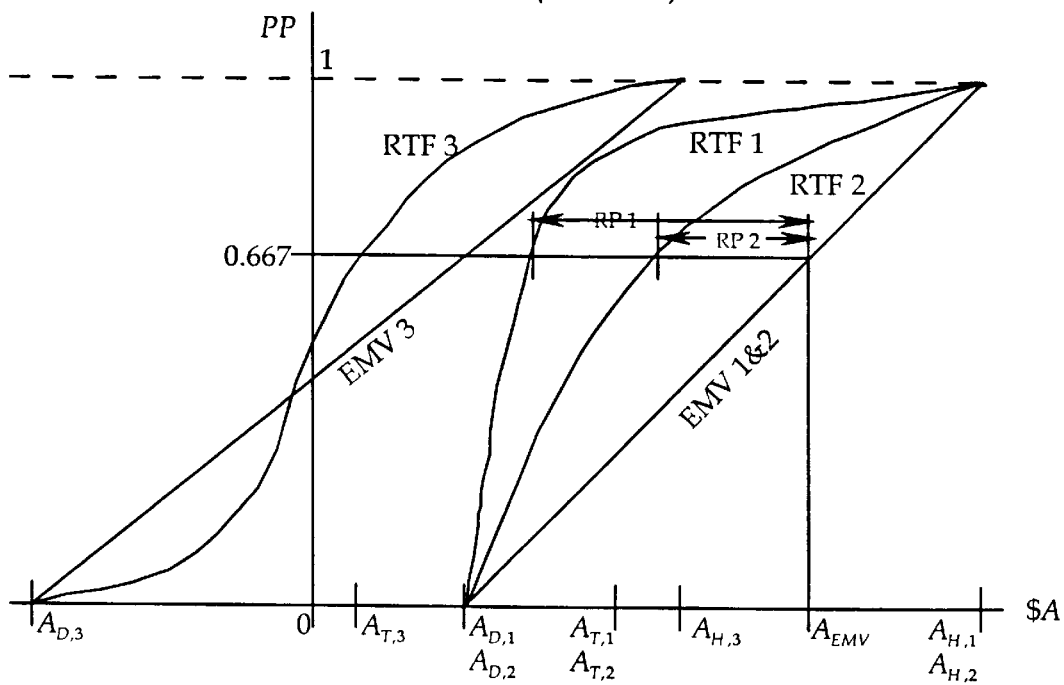
FIG. 2 is an illustration of example investor risk tolerance functions.

We now turn to a detailed discussion of the operation of the RR/CAPM module 303 and its computation of an optimized investment allocation. The operation of the RR/CAPM module 303 is to select the dollar optimal point on the CML as shown in FIG. 1 and defined by the solution to (11). CAPM yielded the fractional portfolio design $f^*$ given in (11) with $f_{RF}$ as the yet to be determined free parameter.

We begin by noting that the CML can be quantified to define the expected monetary value of an investor's total assets as $$\mu_{AF}(f_{RF}) = A_T + A_1[f_{RF}R_{RF} + (1-f_{RF})R_E(f^*)] \quad (15)$$

that is the amount-mapped CML conditioned on $f_{RF} \in [1,0]$ where $R_E$ is the expected rate of return from the risky (point E) portfolio now allocated according to the fixed $f_R^*$. $A_1$ is the amount to be invested and may be made up of funds drawn from $A_T$ and borrowed at $R_{RF}$. We apply (15) in the case when $A_1 A_{1T}$, an amount entirely drawn from $A_T$.

If additional funds $A_B = f_B A_{1T}$ are borrowed, then the CAPM prescribes that $f_{RF}=0$ and the optimum portfolio gain is somewhere beyond point E with portfolio consisting entirely of risky investments allocated according to $f_R^*$. Assuming that the investor uses some fuids $A_{1T}$ from $A_T$, we may condition the total assets in this case on the fraction $f_B > 0$ of $A_{1T}$ borrowed as $$\mu_{AB}(f_B) = A_T + A_{1T}\{R_E(f^*) + f_B[R_E(f^*) - R_{RF}]\} \quad (16)$$

The cash standard deviation of the 'lend only' portfolio is seen to be $$\sigma_{ARF} = A_1(1 - f_{RF})\sigma_E \quad (17)$$

where $\sigma_E = \sigma_s(f_R^*)$ from (3). It is clear how this classical expression of portfolio risk diminishes as a larger fraction is invested at $R_{RF}$. The equivalent dispersion for the 'borrow only' portfolio is $$\sigma_{AB} = A_{1T}(1 + f_B)\sigma_E \quad (18)$$

which is seen to increase appropriately as more borrowed funds are invested. Since $A_{1T} = A_1$ at $f_{RF} = f_B = 0$, the risks are equivalent at the E point as expected.

The basic premise behind RR/CAPM and RDAA is that the investor makes monetary choices in uncertain situations according to the investor's specific tolerance for risk as was discussed in §5.5. Therefore, the salient monetary decisions among alternative portfolios are to be resolved so as to maximize the expected value of PP on the investor's RTF. This is in direct opposition to the conventional view of attempting to represent the risk measure in such terms as the classical 'risk adjusted return' for an investment computed as its expected rate of return divided by the standard deviation of that rate. The conventional commensurate measure for a portfolio would then be given from (4) and (10) by the ratio $\hat{R}_p(f)/\sigma_s(f)$. This further demonstrates how the conventional approach ignores individual attitudes toward monetary risk.

Figure 3:
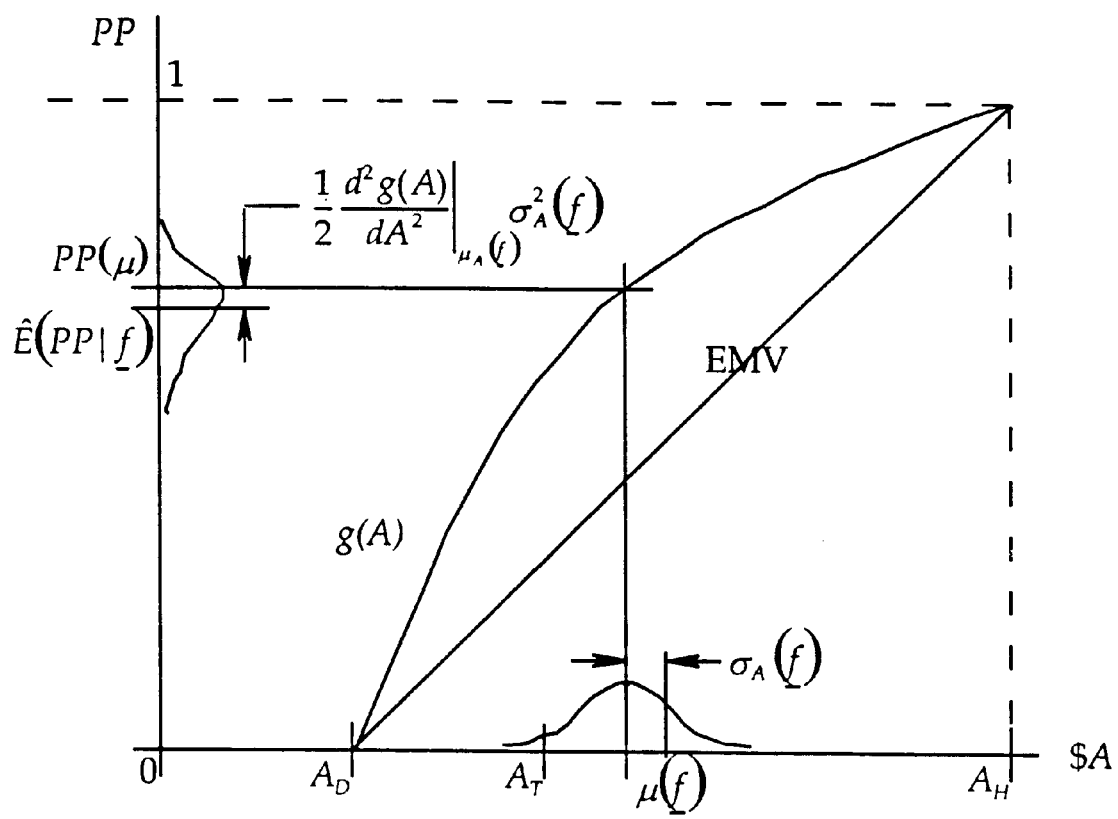
FIG. 3 is an illustration of the mapping of an investment portfolio's probability density function (translated onto the investor's total assets axis) onto the probability preference axis.

The RR/CAPM approach is based on individual risk tolerance expressed over a bounded and currently relevant monetary spectrum. It takes the probability density function (p.d.f.) of predicted total assets at the end of the investment horizon, as defined by (15) through (18), and maps this onto the individual's PP values as represented by the RTF. This mapping is shown in FIG. 3. Specifically we seek to compute the mean of the mapped distribution on the PP axis given by E(PP|$f$) where $f$ is now the appropriate portfolio design fraction vector in the sense discussed above. Let the RTF be represented by the analytical regression g(A) $\in$[0,1] for $A_D \leq A \leq A_H$ with all needed derivatives and where g($A_D$)=0 and g($A_H$)=1. In practice, g(A) need only be locally analytical in the sense described above. Then $$E(PP|\underline{f}) = \int_{-\infty}^{\infty} g(A) h(A|\underline{f}) dA \quad (19)$$

where h(A|$f$) is the portfolio's p.d.f. on total assets. Real world (i.e. 'sane') RTFs are appropriately smooth allowing us to closely approximate the function with a truncated Taylor series in the proximity of the mean A=$\mu$, giving $$g(A) \cong g(\mu) + g'(A)|_\mu (A - \mu) + g''(A)|_\mu \frac{(A - \mu)^2}{2}. \quad (20)$$

Substituting this into the integral in (19) and recalling the definitions for mean and variance [6] allows us to write the approximated expectation as $$\hat{E}(PP|\underline{f}) = g(\mu_A) + g'(A)\Big|_{\mu_A} \int_{-\infty}^{\infty} (A - \mu_A) h(A|\underline{f}) dA + \quad (21)$$

$$\frac{g''(A)|_{\mu_A}}{2} \int_{-\infty}^{\infty} (A - \mu_A)^2 h(A|\underline{f}) dA$$

$$= g(\mu_A) + \frac{g''(A)|_{\mu_A}}{2} \sigma_A^2$$

or more explicitly $$\hat{E}(PP|\underline{f}) = g[\mu_A(\underline{f})] + \frac{1}{2} \frac{d^2 g(A)}{dA^2}\Big|_{\mu_A(f)} \sigma_A^2(\underline{f}) \quad (22)$$

Equation (22) is central to the further development here and, as seen below, its maximization forms the core of all RR/CAPM and RDAA portfolio design solutions.

We immediately note that the derivation of (22) placed no special requirements on the form of the portfolio's p.d.f. It is now the maximization of $\hat{E}$(PP|$f$) that drives the selection of $f$ no matter how we express the details of $\mu_A$ and $\sigma_A$. (Several such important alternative expressions are developed below for the more powerful RDAA method that are equally applicable here.)

The solution $f^*$ to the RR/CAPM portfolio design problem is then stated for $f = [f_R^*, f_{RF}|f_B]$ as $$\underline{f}^* = \arg\max_{\underline{f} \in CML} \hat{E}(PP | \underline{f}) \quad (23)$$

and solved subject to the above stated inputs and constraints using one of the many commonly known non-linear programming methods available [17],[7],[8]. For portfolios where $\hat{E}$(PP|$f$) is convex in $f$ this type of solution unambiguously prescribes the cash-quantified optimal portfolio that correctly reflects the investor's subjective feelings toward assuming monetary risk as defined by his RTF. For non-convex portfolios the solution to (23) may be achieved through one of a number of evolutionary algorithms such as those of the genetic variety [20]. Unfortunately the resulting solution then is merely satisficing and has no guarantee of global optimality.

5.7 Implementation of Risk Direct Asset Allocation by the RDAA Module

The derivation of the RDAA method involves the direct solution of (23) without the constraint that $f \in CML$. In short we now totally bypass the CAPM and its related concepts of the efficient set and capital market line, and directly solve $$\underline{f}^* = \arg\max_{\underline{f}} \hat{E}(PP | \underline{f}) \quad (24)$$

with more complex and complete constructions of $f, \mu_A$, and $\sigma_A$. Nevertheless (22) remains seminal to all our efforts and is repeated here.

$$\hat{E}(PP|\underline{f}) = g[\mu_A(\underline{f})] + \frac{1}{2}\frac{d^2 g(A)}{dA^2}\bigg|_{\mu_A(f)} \sigma_A^2(\underline{f}) \quad (22)$$

Before proceeding it is important to note that (22) does require the predicted distribution h() to have computable first and second moments. This requires special care in the use of the more exotic predictive schemas such as offered by the recent Fractal Market Hypothesis and the Coherent Market Hypothesis [16] which in certain "investor sentiment" domains appeal to infinite variance distributions such as the Pareto-Levy to predict security and market returns. Ultimately the validity of (22) holds; for if the investor cannot select a future with an appropriately finite variance (whether it be analytically computed or supplied as a believable heuristic), then, perhaps, no such risky investment should be made. In practice, however, it all comes down to acting on one's belief, and few investors truly believe that even 'infinite variance investments' will actually perform with unacceptable likelihoods of disaster awaiting them.

5.7.1 The Simplest Case—Straight Investment of $A_{1T}$

The investment fraction vector is now $$\underline{f} = [\underline{f}_R^T, f_{RF}]^T \quad (25)$$

where the risky fractions $$\underline{f}_R = [f_{R,1}, f_{R,2}, \ldots, f_{R,N}]^T \ni f_{R,i} \in [0,1] \forall i \text{ and}$$

$$\sum_{i=1}^{N} f_{R,i} + f_{RF} = 1.$$

We thus see that RDAA permits 'free selection' of the risky fractions and the risk free fraction on a par level of emphasis. If its definition should become useful, one could even conceive of a new efficient set for RDAA in the $\hat{R}$-$\sigma_A$ plane which set would be tangent to the $\hat{R}$ axis at $R_{RF}$ instead of impaling it along the CML. This solution set would be efficient in the sense of providing optimal portfolio designs as one or more input parameters are varied. So we could have a family of RDAA efficient sets to represent the variation in $\hat{R}_M$, a given $\beta_i$, a constraint on $f_R$, etc.

To support the user interface designs discussed above for the investor, we will re-formulate the covariance matrix of the risky securities. Let $[\rho]$ be the correlation matrix corresponding to covS given in (1) such that each element $\rho_{ij}$ represents the correlation coefficient between securities i and j defined as $$\rho_{ij} = \frac{\sigma_{i,j}^2}{\sigma_i \sigma_j} \quad (26)$$

then $$\text{cov } S = [\rho] \cdot \ast \sigma \sigma^T \quad (27)$$

where .* is the 'corresponding element' matrix multiplication operator and $\sigma$ is the N-vector of standard deviations. Fractionally allocated rate covariance is again used to compute the total portfolio rate variance as $$\sigma_s^2(f) = f^T \text{ cov } Sf \quad (28)$$

If we now invest $A_{1T}$ according to the amount allocation vector x with components $x_i = A_{1T} f_i$, i=1,N, then the cash variance of the resulting portfolio will be $$\sigma_A^2(f, A_{1T}) = x^T \text{ cov } Sx = A_{1T}^2 \sigma_s^2(f). \quad (29)$$

The expected portfolio appreciation will increase the expected assets to $$\mu_A(\underline{f}, A_{IT}) = A_T + A_{IT}\left\{\sum_{i=1}^{N} f_{R,i}\hat{s}_i + f_{RF}R_{RF}\right\}. \quad (30)$$

where $\hat{s}_i$ is the appreciation rate of the ith risky security introduced in §2.2.1. 1. We emphasize again that $\hat{s}_i$ may be computed from any analytical model or heuristic which is believed to appropriately predict future performance. The only requirement is that the choice of such predictions also yield an appropriate formulation of an equally believable covS, the covariance matrix defined in (27).

With the definition of the first two moments of the predicted assets distribution we compute the expected value of the risk adjusted PP according to (22) using the formulations of $\sigma_A$ and $\mu_A$ given in (29) and (27) respectively. The optimal portfolio then is obtained from the pair $$\hat{E}(PP|\underline{f}, A_{IT}) = g[\mu_A(\underline{f}, A_{IT})] + \frac{1}{2}\frac{d^2 g(A)}{dA^2}\bigg|_{\mu_A(\underline{f},A_{IT})} \sigma_A^2(\underline{f}, A_{IT}), \quad (31)$$

$$\underline{f}^* = \underset{\underline{f}}{\operatorname{argmax}} \hat{E}(PP|\underline{f}) \quad (32)$$

subject to the investor's input of $A_{IT}$ and the constraint given with (25). N+1 parameters are thus derived from a search over N-space. The amount optimal portfolio design for the simplest case is then given by $$x^* = A_{1T} \underline{f}^*. \quad (33)$$

We point out that (31) could have been equally well expressed in terms of x such that $\Sigma x_i = A_{1T}$ and the optimum solution x* derived directly from (32). (The latter form is used in the MATLAB® program set forth in microfiche Appendix A.

Finally, it is clear that this case also covers solutions for portfolios containing only risky securities since we may set $R_{RF}$ to some large negative value thereby guaranteeing that no funds will be lent at this rate.

5.7.2 Investment with Combined Lending and Borrowing

Suppose the investor may also borrow funds additional to $A_{1T}$ at some rate $R_B$ that may or may not be equal to $R_{RF}$. It is, of course, reasonable to assume that $R_B = R_{RF}$, although this is not a limitation for the RDAA solution we now develop. Frequently, especially in conjunction with other business transactions, there are times when an investor may have the opportunity to borrow some funds at $R_B < R_{RF}$. We further assume that the investor is willing to (or may) borrow an amount $A_B = f_{B,L1M} A_{1T}$ where $f_{B,L1M}$ is an additional investor supplied constraint such that $0 = f_B = f_{B,L1M}$. We express the risky 'lending-borrowing' allocation amount vector as $$x_{LB} = A_{1T}(1+f_B)\underline{f}_R \quad (34)$$

where $\underline{f}_R$ is now the column N-vector of 'risky fractions'. The resulting variance expression is then $$\sigma_A^2(f, A_{1T}) = x_{LB}^T \text{ covS } x_{LB} \quad (35)$$

with the augmented decision (fraction) vector $\underline{f} = [\underline{f}_R^T, f_{RF}, f_B]$ retaining the constraints given in §5.7.1. With lending and borrowing the mean is now $$\mu_A(f, A_{IT}) = A_T + A_{IT}(1 + f_B)\left\{\sum_{i=1}^{N} f_{R,i}\hat{s}_i + f_{RF}R_{RF}\right\} - R_B f_B A_{IT} \quad (36)$$

These values are used to compute $\hat{E}(PP|f,A_{1T})$ in (3 1) and incorporated into the optimum solution (in N+1 space) for the N+2 variables $$f_-^* = \text{argsmax}_{f_-} \hat{E}(PP|f_-, A_{IT}) \quad (37)$$

The resulting policy calls for a total invested amount of $A_1^* = A_{1T}(1+f_B^*)$ made up of owned and borrowed funds to be invested in the amounts $$x_R^* = A_1^* f_R^*, \; x_{RF}^* = A_1^* f_{RF}^* \quad (38)$$

We note that $A_1^*$ is 'only partially optimized' since at this point the total invested amount is still influenced largely by the investor's selection of $A_{1T}$. This requirement will be removed in the subsequent development.

We point out that the above optimal portfolio solution demonstrates RDAA's inherent ability to solve the concurrent lending and borrowing problem without imposing additional restrictions or constraints. Within such a favorable interest rate environment RDAA could discover an investment policy wherein it may behoove the investor to simultaneously reject both counts of the adage "never a borrower or lender be".

5.7.3 The Optimal Amount to Invest

The preceding RDAA solutions robustly cull the Nmember 'short list' when certain issues provide no benefits of diversification. However so far we have been forced to invest the entire amounts specified by $A_{1T}$ and $A_1$ no matter what the current risk free return $R_{RF}$ or the historical performance (e.g. reflected by $\alpha$, $\beta$, $\sigma$, covS) of the N securities. Due to its direct approach to maximizing the investor's utility-mapped PP, RDAA may also be configured to select the amount $A_{1T}$ to be invested subject to the investor supplied constraint that $A_{1T} \in [0, f_{1,L1M} A_T]$ where 023 $f_{1,L1M} \leq 1$ is termed the investment fraction of total net assets.

We begin by again augmenting the decision vector of fractions so that now $$f = [f_R^T, f_{RF}, f_B, f_1] \quad (39)$$

is an N+3 vector requiring a search in N+2 space. The RDAA solution here is essentially a replication of the lending/borrowing model of §5.7.2 with $f_1 A_T$ substituted for $A_{1T}$. We list the relevant relationships without comment.

$$x_1 = A_T f_1 (1+f_B) f_R \quad (40)$$

$$\sigma_A^2(f) = x_1^T \text{covS}\, x_I \quad (41)$$

$$\mu_A(f) = A_T \left\{1 + f_I(1+f_B)\left[\sum_{i=1}^{N} f_{R,i}\hat{s}_i + f_{RF}R_{RF}\right] - R_B f_B f_I\right\} \quad (42)$$

These are now used to compute $\hat{E}(PP|f)$ per (22) for obtaining $$f^* = \arg\max/f \hat{E})PP|f) \quad (43)$$

The apparent simplicity of the recurring optimization problem statement in these developments may cause one to overlook the fact that the solution has become more non-linear and complex in the decision variables $f$ as we have added degrees of freedom and power to the model.

The amount optimal portfolio is obtained by calculating the optimal total amount to invest from owned and borrowed funds $$A_I^* = A_T f_I^*(1+f_B^*) \quad (44)$$

which is allocated according to $$x_R^* = A_T f_I^*(1+f_B^*)f_R^*, \; x_{RF}^* = A_T f_I^*(1+f_B^*)f_{RF}^* \quad (45)$$

This aspect of the RDAA is the first time that any asset allocation method can unambiguously advise the investor that the short list she has developed is not worthy of the entire amount she is prepared to invest. If RDAA yields $f_I^* < f_{1,L1M}$, then this message strongly recommends a review and revision of not only the short list contents but, perhaps also, a reconsideration of the underlying methodology used to select the N securities.

Before concluding this subsection we introduce a further capability of both RR/CAPM and RDAA that applies uniformly to all solution forms. This is the ability of the investor to specify enforced diversification and/or minimums for all elements of the decision vector $f$ such as may be imposed by prudence, corporate policy, or governmental regulations on, say, a mutual funds manager. The implementation of this feature was shown in the user interface 701 of FIG. 7, with the constraint brackets 707. Such sophisticated solutions are obtained by directly supplying an additional set of constraint vectors $f_L$ and $f_U$ for the lower and upper bounds respectively. The required constraints are then the by-element vector inequalities $$f_L \cdot \leq f \cdot \leq f_u \quad (46)$$

with the understanding that the elements of both constraint vectors must also satisfy the intrinsic semantic constraints defined above. The response of these algorithms to the constraints provides an additional set of feedback messages to the investor then consisting of either how the invested amount $A_I$ is reduced and/or which securities are rejected from the portfolio or both.

5.7.4 The 'Complete' Solution

We conclude this explication by studying how several important additional investor supplied parameters that characterize 'real world' investments would be incorporated. As further expanded in §5.7.5, the inclusion of these parameters is meant to be 'complete' only within the scope of this presentation of RDAA and does not imply that RDAA (and RR/CAPM) capabilities are limited to the present embodiment.

The RDAA (and RR/CAPM) methods and implementations presented here may be augmented with an arbitrary number of additional inputs that adjust and tune the actual portfolio costs to the investor. We complete this development by presenting the RDAA model which incorporates all of the above with the inclusion of the following added costs that are often experienced in practice.

$v_{FL}$—N-vector of front load rates for each security that diminish the actual amounts invested (the inclusion of a back load is a straightforward extension and is demonstrated here through $\text{frac}_{OUT}$ defined below);

$v_p$—the portfolio advisor or management load rate imposed over the investment horizon;

$f_{RP} = [\text{frac}_{IN}, f_{OUT}]$, a simplified application of $v_p$ to approximate the usual quarterly portfolio advisor fees computed by charging the going in fraction, $\text{frac}_{IN}$, of $v_p$ as front load and the coming out fraction, $\text{frac}_{OUT}$, of $v_p$ as a back load at the end of the investment horizon.

The explicit limit fraction $f_{RF}=f_{RF,LIM}$ where $f_{RF,LIM}$ is used to control the fraction of $A_1$ that will be invested at the risk free rate $R_{RF} \cdot f_{RF,LIM}$ is the (N+1)th element of $f_U$ in (46).

The portfolio advisor amount charged going in is $$A_{P,in} = v_P f_{RP,1} A_1 = A_T f_I (1+f_B) v_P f_{RP,1} \quad (47)$$

and the total front load amount is computed as $$A_{FL} = (A_I - A_{P,in}) \sum_{i=1}^{N} f_i r_{FL,i} \quad (48)$$

$$= A_T f_I (1+f_B)(1-r_P f_{RP,1}) \sum_{i=1}^{N} f_i r_{FL,i}$$

which yields the risked invested amounts vector components of $x_R$ as $$x_{R,i}=(A_I-A_{P,in})f_{R,i}(1-v_{FL,i})=A_T f_I(1+f_B)(1-v_P f_{RP,1})f_{R,i}(1-v_{FL,i})$$
$$i=1,N \quad (49)$$

along with the risk free amount $$x_{RF}=A_T f_I(1+f_B)(1-v_P f_{RP,1})f_{RF} \quad (50)$$

The expected amount of portfolio appreciation at the end of $T_I$ is $$A_{RP} = \sum_{i=1}^{N} x_{R,i} \hat{s}_i + x_{RF} R_{RF} \quad (51)$$

from which we must deduct the loan interest $A_B R_B = A_T f_I f_B R_B$ and portfolio management fee $$A_{P,out}=(A_I+A_{RP}-A_{P,in})v_P f_{RP,2} \quad (52)$$

We can now express the expected total assets at the end of $T_I$ to be $$\mu_A(f)=A_T-A_{P,in}-A_{FL}+A_{RP}-A_{P,out} \quad (53)$$

where we recall the vector of decision variables to be $f=[f_R^T, f_{RF}, f_B, f_I]^T$ with $$f_R = [f_{R,1}, f_{R,2}, \ldots, f_{R,N}]^T \ni f_{R,i} \in [0,1] \forall i \text{ and}$$

$$\sum_{i=1}^{N} f_{R,i} + f_{RF} = 1.$$

Now substituting the above definitions gives the investor's expected total assets at the end of $T_1$ in terms of the decision variables.

$$\mu_A(\underline{f}) = A_T \Bigg\{ 1 + f_I(1+f_B)(1-r_P f_{RP,1})(1-r_P f_{RP,2}) \quad (54)$$

$$\left[ \sum_{i=1}^{N} f_{R,i}(\hat{s}_i - r_{FL,i}) + f_{RF} R_{RF} + \right.$$

$$\left. \frac{(r_P[f_{RP,2}(1-r_P f_{RP,1}) - f_{RP,1}] - f_I f_B R_B(1-r_P f_{RP,2}))}{((1-r_P f_{RP,1})(1-r_P f_{RP,2}))} \right] \Bigg\}$$

The portfolio amount covariance is then $$\sigma_A^2(f)=x_R^T \text{covS } x_R \quad (55)$$

The solution is again obtained by calculating $\hat{E}(PP|f)$ from (22) and using it in the now familiar constrained non-linear programming problem $$f^*=\arg \max/f_L \leq f \leq f_U \hat{E}(PP|f) \quad (56)$$

The final portfolio design amounts can be computed from (47) to (55) by substituting the appropriate elements of the optimum allocation vector $f^*$.

5.7.5 Value at Risk and RDAA

We conclude by integrating the concept of Value at Risk (VAR) as a natural inequality constraint to the RDAA (and RR/CAPM) solution. VAR is one of the financial industry's latest attempts to bring together the investor's quantitative aversion to risk and the task of portfolio selection without resorting to utility theory per se. Rather than serve as a substitute for monetary utility, VAR is seen in the sequel as a natural augmentation to the incorporation of monetary utility as presented here. The motivation for this feature is based on the notion or Bernstein's [22] "central idea" of risk as "that variability (which) should be studied in reference to some benchmark or some minimum rate of return that the investor has to exceed."

VAR is formally defined as the amount of money $A_{VAR}$ such that a portfolio is expected to lose less than this amount over the investment horizon with probability $P_{VAR}$.

It is clear that the prescription is readily accessible to the non-technical investor. Eliciting this pair of values will constrain the optimal $f^*$ to generating predicted portfolio p.d.f.s that limit the probability of loss $P_L$ while still maximizing the risk compensated return of (22). $P_L$ is defined with respect to an amount $A'_T$ which may be the net current assets $A_T$, or $A_T$ appreciated by placing the total invested amount $A'_T$ at the risk free rate. $P_L$ is then the probability that the investor's net total assets at the end of the investment horizon will be less than $A'_T$. In terms of the portfolio's predicted p.d.f. h(), as defined over the amount axis (cf. 22), $P_L$ is the probability mass 'to the left of' the $A'_T$ point on the amount axis.

According to the definition of VAR, the required relationship between $P_L$ and $P_{VAR}$ is then $$P_{VAR} \leq 1 - P_L(\mu, A'_T - A_{VAR}) \quad (57)$$

$$\leq 1 - \frac{1}{2}\left[1 + \text{erf}\left(\frac{(A'_T - A_{VAR}) - \mu}{\sqrt{2}\sigma_A^2}\right)\right]$$

$$\leq 1 - \frac{1}{2}\text{erfc}\left(\frac{\mu - (A'_T - A_{VAR})}{\sqrt{2}\sigma_A^2}\right)$$

Where erf and erfc are the direct and complimentary error functions. Or, expressed in terms of an inequality constraint in non-linear programming, it becomes $$P_{VAR} - 1 + \frac{1}{2}\text{erfc}\left(\frac{\mu - (A'_T - A_{VAR})}{\sqrt{2}\sigma_A^2}\right) \leq 0 \quad (58)$$

The primary effect on the RDAA solution of including such a constraint is in its ability to set a maximum amount to be invested in the risky portion of the portfolio. A more pronounced secondary effect may also be observed when the investor presents RDAA with a poor short list and/or is adamant about imposing inappropriately high minimum constraint fractions to risky securities. In this case the VAR constraint appeals to the only remaining 'policy levers' available to it, namely the investment and borrowing fractions $f_I$ and $f_B$, and will cause RDAA to unambiguously recommend a reduced total invested amount that yields the specified VAR.

A last benefit of including the VAR constraint involves expanding the ability of RDAA to tolerate 'marginally sane' investor RTFs. This more sophisticated benefit comes into play when the investor—perhaps carelessly—inputs reference gamble points that yield unrealistically low Risk Compensation Coefficient values (i.e. one half times the second partial derivative in (22)) over a part of the amount axis—i.e. the RTF's second derivative approaches zero as the risk premium approaches a linear function of predicted net total assets. In this case the portfolio's volatility, $\sigma_A$, may be discounted too much by (22) if the optimum lies in this region of predicted net total assets. Including the VAR constraint, however, causes RDAA to never overlook or discount this fundamental and overriding measure of risk.

5.8 Summary

In summary, the present invention provides an analytically correct system and method of determining an optimal allocation of an investor's investment assets among any set of investment securities.

It should be clear from the above development that this presentation has not exhausted the complexity of the financial models which may be embedded in the overall RDAA framework. Some obvious and straightforward extensions include marginally taxed dividend yields for certain securities and the inclusion of the investor's current portfolio as part of the N security short list presented to RDAA. With the latter would be included the appropriate capital gains and marginal tax rates along with the costs and current prices of the held securities.

It is also possible to handle more complex formulations of the resulting portfolio's p.d.f. via a direct extension of the risk compensated utility mapping of (22) such as may be required for portfolios that include options and/or derivatives. A more conventional case that may occur in practice for risk tolerant investors is when high variance financial instruments are included which yield a portfolio variance containing a significant probability mass below the 'total loss amount' or residual net assets or $$\mu_A - \sum x_{R,i}.$$

Figure 12:
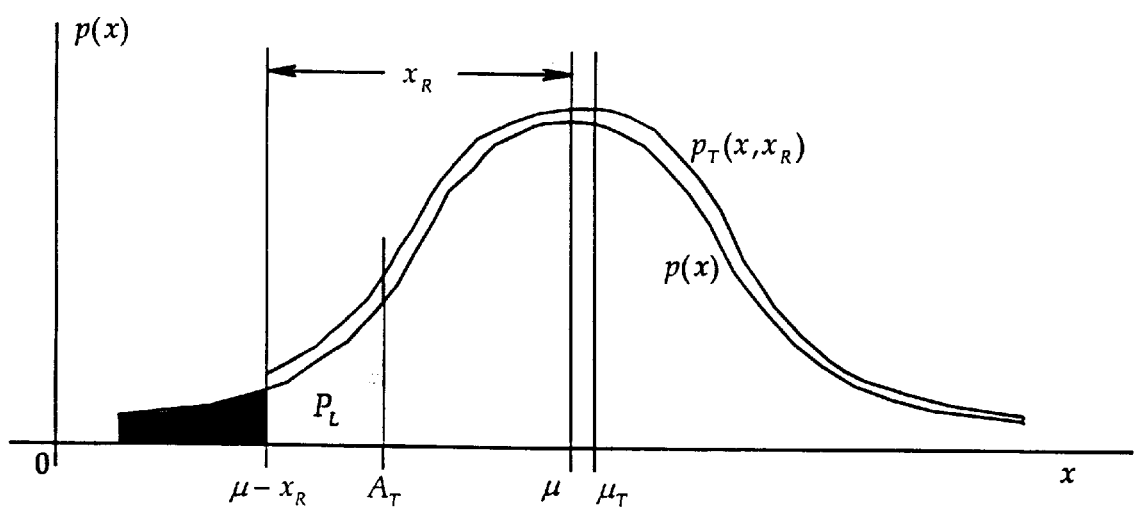
FIG. 12 is an illustration of a gaussian distribution of a portfolio where maximum loss is limited to the sum of risky investments.

In such cases the probability of loss would be over stated in the situations where the maximum loss is restricted to the total amount of the risky investments. This is because the portfolio's (usually gaussian) p.d.f would then be truncated at the total loss amount. In addition, such a truncated p.d.f. has a higher mean and a reduced variance. The necessary modifications to $\mu_A$ and $\sigma_A^2$ are as follows:

We now derive the portfolio mean and variance expressions corrected for the case when the maximum loss possible is limited to the sum of all invested risky amounts. The situation is depicted in FIG. 12. The original gaussian density for the portfolio is given by $$p(x) = \frac{1}{\sqrt{2\pi}\,\sigma} \exp\left[-\frac{(\mu - x)^2}{2\sigma^2}\right] \tag{59}$$

Where $\mu$ is the expected value of investor net assets and $\sigma$ is its standard deviation. Suppose the maximum amount at risk that can be lost is $x_R$, then the original p.d.f is truncated at $x_R$ as shown in the figure. The truncated probability mass is redistributed to yield a new p.d.f. given by $$p_T(x, x_R) = \frac{p(x)}{1 - \int_{-\infty}^{x_R} p(x)dx}, \quad x \geq x_R \tag{60}$$

$$= 0, \quad x < x_R$$

The integral in (60) can be expressed in terms of the error function as $$\mathrm{erf}(y) = \frac{2}{\sqrt{\pi}} \int_0^y e^{-\frac{t^2}{2}} dt \tag{61}$$

Using this with $t=(x-\mu)/\sigma$ in (62) gives us the piecewise defined truncated density as $$p_T(x, x_R) = \frac{p(x)}{1 - \frac{1}{2}\left[1 + \mathrm{erf}\left(\frac{x_R - \mu}{\sqrt{2}\,\sigma}\right)\right]} \tag{62}$$

$$= \frac{2p(x)}{1 - \mathrm{erf}\left(\frac{x_R - \mu}{\sqrt{2}\,\sigma}\right)}, \quad x \geq x_R$$

$$= 0, \quad x < x_R$$

and its cumulative distribution $$P_T(x, x_R) = \int_{x_R}^x p_T(\xi, x_R)d\xi \tag{63}$$

$$= \frac{\mathrm{erf}\left(\frac{x - \mu}{\sqrt{2}\,\sigma}\right) - \mathrm{erf}\left(\frac{x_R - \mu}{\sqrt{2}\,\sigma}\right)}{1 - \mathrm{erf}\left(\frac{x_R - \mu}{\sqrt{2}\,\sigma}\right)}, \quad x \geq x_R$$

$$= 0, \quad x < x_R$$

As indicated in Meyer [20], such a truncated gaussian has its mean and variance given by $$\mu_T = \mu + \sigma \frac{\phi(z_R)}{\Phi(z_R)} \tag{64}$$

$$\sigma_T^2 = \sigma^2 \left\{ 1 - \left[\frac{\phi(z_R)}{\Phi(z_R)}\right]^2 + z_R \frac{\phi(z_R)}{\Phi(z_R)} \right\} \tag{65}$$

where the nornalized deviate $z_R=(x_R-\mu)/\sigma$ with their respective density and cumulative counterparts $$\phi(z_R) = \frac{e^{-z_R^2/2}}{\sqrt{2\pi}} \tag{66}$$

$$\Phi(z_R) = \frac{1}{\sqrt{2\pi}} \int_{-\infty}^{z_R} e^{-t^2/2} dt \tag{67}$$

$$= \frac{1}{2}\left[1 - \mathrm{erf}\left(\frac{z_R}{\sqrt{2}}\right)\right]$$

Expressing the ratio in (64) and (65) as $$\lambda(z_R) = \frac{\phi(z_R)}{\Phi(z_R)} = \sqrt{\frac{2}{\pi}} \left[ \frac{e^{-z_R^2/2}}{1 - \text{erf}\left(\frac{z_R}{\sqrt{2}}\right)} \right] \quad (68)$$

or in terms of the original portfolio mean variance $$\lambda(\mu, x_R) = \sqrt{\frac{2}{\pi}} \left[ \frac{e^{-x_R^2/2}}{1 - \text{erf}\left(\frac{x_R}{\sqrt{2}}\right)} \right] \quad (69)$$

lets us write the desired corrected mean and variance for the truncated distribution as $$\mu_T = \mu + \sigma \lambda(\mu, x_R) \quad (70)$$

$$\sigma_T^2 = \sigma^2 \left\{ 1 - \lambda(\mu, x_R)^2 - \frac{x_R \lambda(\mu, x_R)}{\sigma} \right\} \quad (71)$$

which can be used to re-enter (22) in obtaining the RDAA optimum presented above.

An additional output of interest to the investor is the probability of loss $P_L$ as illustrated in FIG. 12. This same measure of the recommended portfolio is also useful for calculating certain 'value at risk' problem formulations (cf. §5.7.4) and is obtained directly from (63) as $$P_L = \frac{\text{erf}\left(\frac{A_T - \mu}{\sqrt{2}\sigma}\right) + \text{erf}\left(\frac{x_R}{\sqrt{2}\sigma}\right)}{1 + \text{erf}\left(\frac{x_R}{\sqrt{2}\sigma}\right)}, \quad \mu - x_R < A_T \quad (72)$$

$$= 0, \quad \mu - x_R \geq A_T$$

Finally, since RDAA yields the portfolio's p.d.f. mean and variance in monetary terms, it is possible to compute the total probability $P_L$ of losing money from the recommended investments. The accuracy of this estimated probability is based on the extent to which the portfolio's amount p.d.f. tends to the normal distribution [16]. Within this notion it is possible to conceive of extended RDAA solutions in which the investor adds further constraints to limit this loss probability to a specified level, for example using Value at Risk metrics. In sum, the fundamental RDAA structure welcomes these kinds of embellishments and extensions.

REFERENCES

[1] Keeney, R. L., Raiffa, H., *Decisions with Multiple Objectives: Preferences and Value Tradeoffs*, John Wiley & Sons, 1976.

[2] Pearl, J., *Probabilistic Reasoning in Intelligent Systems: Networks of Plausible Inference*, Morgan Kaufman, 1988, Chpt. 6.

[3] Behn, R. D., Vaupel, J. W., *Quick Analysis for Busy Decision Makers*, Basic Books, 1982, Chpt. 8.

[4] Ross, S. A., Westerfield, R. W., Jaffe, J. F., *Corporate Finance*, Irwin, 1993, Chpts 9, 10.

[5] Zwillinger, D., ed., "Standard Mathematical Tables and Formulae—30th Edition", CRC Press, 1996.

[6] Papoulis, A., *Probability, Random Variables, and Stochastic Processes*, McGraw-Hill, 1965.

[7] Pierre, D. A., Lowe, M. J., *Mathematical Programming Via Augmented Lagrangians*, Addison-Wesley, 1975.

[8] Grace, A., *Optimization Toolbox* (MATLAB®), The MathWorks, Inc., 1992.

[9] Muth, J., "Rational Expectations and the Theory of Price Movements", *Econometrica*—29, 1961.

[10] Casti, John L., *Searching for Certainty—What Scientists Can Know About the Future*, William Morrow & Company, 1990.

[11] Sharpe, W., "Capital Assets Prices: A Theory of Market Equilibrium Under Conditions of Risk", *Journal of Finance*—19, 1964.

[12] Markowitz, Harry, *Portfolio Selection*, John Wiley & Sons, 1959.

[13] Ross, Stephen A., "The Arbitrage Theory of Capital Asset Pricing", *Journal of Economic Theory, December* 1976.

[14] O'Shaughnessy, James P., *Invest Like the Best*, McGraw-Hill, 1994.

[15] Statman, Meir, "How Many Stocks Make a Diversified Portfolio?", *Journal of Financial and Quantitative Analysis*, September 1987.

[16] Peters, Edgar E., *Chaos and Order in the Capital Markets*, John Wiley & Sons, 1991.

[17] Press, W. H., et.al., *Numerical Recipes in C: The Art of Scientific Computing*, Cambridge University Press, 1988.

[18] Sharpe, W. F., "Portfolio Choice" (ver 4October 1996) Copyright ©1995, William F. Sharpe (wfsharpe@leland.stanford.edu).

[19] Meyer, S. L., *Data Analysis for Scientists and Engineers*, John Wiley & Sons, 1975.

[20] Goldberg, David E., *Genetic Algorithms in Search, Optimization, & Machine Learning*, Addison-Wesley, 1989.

[21] Bernstein, Peter L., *Against the Gods: The Remarkable Story of Risk*, Wiley & Sons, 1996.

I claim:

1. A computer implemented method of allocating investment funds of an investor in a portfolio comprising a plurality of investments, comprising: determining a risk tolerance function for the investor specifying the investor's probability preference at each of the plurality of monetary amounts relative to a monetary range relevant to the investor;

allocating the investment funds among the investments to create an investment allocation by maximizing an expected value of a first probability density function of the investor's probability preferences determined as a function of a second probability density function of the portfolio's predicted market performance with respect to the investment funds and the investor's risk tolerance function; and allocating the investment funds comprises executing the equation:

$$E\Big(PP(f)\Big) = g[\mu_A(f)] + \frac{1}{2} \frac{d^2 g(A)}{dA^2}\bigg|_{\mu_A(f)} \sigma_A^2(f)$$

where f is an allocation policy vector of N risky investments and one risk free investment;

A is a monetary amount expressed over the investor's range of potential net assets;

PP is a monetary preference probability value that quantitatively defines the investor's monetary utility for a monetary amount A;

g() is the investor's monetary risk tolerance function that relates monetary preference probability (PP) to monetary amounts;

$\mu_A(f)$ is the expected value of the investor's net assets amount as a result of implementing allocation policy f, computed from the second probability density function of the portfolio's predicted market performance;

$\sigma_A(f)$ is a standard deviation of the investor's net assets amount as a result of implementing allocation policy f, computed from the second probability density function; and $\hat{E}()$ is an approximated expectation of PP from the first probability density function of preference probabilities obtained by mapping the second probability density function of the investor's net assets through the risk tolerance function.

2. A computer implemented method of allocating investment funds of an investor in a portfolio comprising a plurality of investments, comprising:

determining a risk tolerance function for the investor specifying the investor's probability preference at each of the plurality of monetary amounts relative to a monetary range relevant to the investor;

allocating the investment funds among the investments to create an investment allocation by maximizing an expected value of a first probability density function of the investor's probability preferences determined as a function of a second probability density function of the portfolio's predicted market performance with respect to the investment funds and the investor's risk tolerance function; and allocating the investment funds comprises evaluating the equation:

$$E(PP \mid \underline{f}) = \int_{-\infty}^{\infty} g(A) h(A \mid \underline{f}) dA$$

where:

g(A) is the investor's risk tolerance function, $g(A) \in [0, 1]$ for $A_D \leq A \leq A_H$, and $g(A_D)=0$, and $g(A_H)=1$;

$A_D$ is an investor defined putative worst monetary amount;

$A_H$ is an investor defined putative best monetary amount; and h(A|f) is the second probability density function with respect to the investor's net asset amount given allocation policy f.

3. The computer implemented method of claim 2, wherein the investor's risk tolerance function g(A) is approximated by a truncated Taylor series about an expected value of the mapped preference probability density function.

4. The computer implemented method of claim 2, further comprising:

allocating the investment finds among the investments by selecting an investment allocation on a capital market line that maximizes $\hat{E}(PP)$ of the portfolio given the investor's risk tolerance function.

5. The computer implemented method of claim 2, wherein the investment allocation $f^*$ defines optimal fractional allocations of the investment funds in the investments of the portfolio, where:

$f^* = \arg \max \hat{E}(PP|f), f \in CML$ where:

CML is the infinite set of possible portfolios defined by the capital market line;

$f = [f_{R^*}, f_{RF} | f_B]$ where:

$f_R^*$ is the total fractional allocation of the investment fimds to risky investments allocated optimally on the efficient frontier at the tangent point of the CML;

$f_B$ is the total fraction of invested funds to borrow additional funds, or allocate $f_{RF}$ as the total fractional allocation to risk free investments, $f_{RF} \in [0, 1]$ and $f_{RF}=0$ if $f_B>0$.

6. The computer implemented method of claim 2, wherein the investment allocation $f^*$ defines optimal fractional allocations of the investment funds in the investments of the portfolio, where:

$f^* = \arg \max \hat{E}(PP|f)$ where:

$f = [f_R^T, f_{RF}]^T$ where:

$f_R^T$ is the fractional allocation of the investment funds to risky investments over time period T, $f_R^T = [f_{R,1}, f_{R,2}, \ldots f_{R,N}]^T \in [0,1] \forall i$;

$f_{RF}$ is the total fractional allocation to risk free investments; and, $$\sum_{i=1}^{N} f_{R,i} + f_{RF} = 1.$$

7. A computer implemented method of allocating investment funds of an investor in a portfolio comprising a plurality of investments, comprising:

determining a risk tolerance function for the investor specifying the investor's probability preference at each of the plurality of monetary amounts relative to a monetary range relevant to the investor;

allocating the investment funds among the investments to create an investment allocation by maximizing an expected value of a first probability density function of the investor's probability preferences determined as a function of a second probability density function of the portfolio's predicted market performance with respect to the investment funds and the investor's risk tolerance function;

allocating the investment funds among the investments in the portfolio by mapping the second probability density function for the portfolio through the risk tolerance function to create the first probability density function of the investor's probability preferences;

determining the expected value of the first probability density function; and repeating the allocating step with a different allocation of the investment funds among the investments in the portfolio until the expected value of the first probability density function is maximized.

8. A computer implemented method of allocating investment funds of an investor in a portfolio comprising a plurality of investments, comprising:

determining a risk tolerance function for the investor specifying the investor's probability preference at each of the plurality of monetary amounts relative to a monetary range relevant to the investor;

allocating the investment funds among the investments to create an investment allocation by maximizing an exDected value of a first probability density function of the investor's probability preferences determined as a function of a second probability density function of the portfolio's predicted market performance with respect to the investment funds and the investor's risk tolerance function; and wherein the investment funds include borrowed funds at a rate not necessarily equal to the risk free rate.

9. A computer implemented method of allocating investment funds of an investor in a portfolio comprising a plurality of investments, comprising:

determining a risk tolerance function for the investor specifying the investor's probability preference at each of the plurality of monetary amounts relative to a monetary range relevant to the investor;

allocating the investment funds among the investments to create an investment allocation by maximizing an expected value of a first probability density function of the investor's probability preferences determined as a function of a second probability density function of the portfolio's predicted market performance with respect to the investment funds and the investor's risk tolerance function; and wherein the investment funds is further constrained by:
the investor's input of Value at Risk parameters $A_{VAR}$ and $P_{VAR}$ that define the maximum value $A_{VAR}$ the investor is willing to lose with probability $P_{VAR}$; and,
the application of these parameters to guide the solution for the overall portfolio decision vector f.

10. A computer implemented method of allocating investment funds of an investor in a portfolio comprising a plurality of investments, comprising:

determining a risk tolerance function for the investor specifying the investor's probability preference at each of the plurality of monetary amounts relative to a monetary range relevant to the investor;

allocating the investment funds among the investments to create an investment allocation by maximizing an expected value of a first probability density function of the investor's probability preferences determined as a function of a second probability density function of the portfolio's predicted market performance with respect to the investment funds and the investor's risk tolerance function; and allocation of the investment funds to any subset of investments in the portfolio is constrained by:
an upper constraint vector $f_u$ defining a maximum portion of the investment funds that may be allocated to the subset of investments; and,
a lower constraint vector $f_l$ defining a minimum portion of the investment funds that may be allocated to the subset of investments.

11. A computer implemented method of allocating investment funds of an investor in a portfolio comprising a plurality of investments, comprising:

determining a risk tolerance function for the investor specifying the investor's probability preference at each of the plurality of monetary amounts relative to a monetary range relevant to the investor;

allocating the investment funds among the investments to create an investment allocation by maximizing an expected value of a first probability density function of the investor's probability preferences determined as a function of a second probability density function of the portfolio's predicted market performance with respect to the investment funds and the investor's risk tolerance function; and allocation of the investment funds to any subset of investments in the portfolio is constrained by:
an upper constraint vector $f_u$ defining a maximum monetary amount of the investment funds that may be allocated to the subset of investments; and,
a lower constraint vector $f_l$ defining a minimum monetary amount of the investment funds that may be allocated to the subset of investments.

12. A computer implemented method of allocating investment funds of an investor in a portfolio comprising a plurality of investments, comprising:

determining a risk tolerance function for the investor specifving the investor's probability preference at each of the plurality of monetary amounts relative to a monetary range relevant to the investor;

allocating the investment funds among the investments to create an investment allocation by maximizing an expected value of a first probability density function of the investor's probability preferences determined as a function of a second probability densitv function of the portfolio's predicted market performance with respect to the investment funds and the investor's risk tolerance function;

receiving at least one market performance prediction for an investment period;

receiving for each market performance prediction an input weighting the market performance prediction;

combining the weighted market performance predictions to define an overall market performance prediction; and determining the portfolio's predicted performance as a function of the overall market performance prediction.

13. The computer implemented method of claim 12, wherein:

each market performance prediction includes an interval between an upper and lower bound of expected market rates of return, and a confidence percentage defining the probability that an actual market return will be in the interval.

14. A computer implemented method of allocating investment funds of an investor in a portfolio comprising a plurality of investments, comprising:

determining a risk tolerance function for the investor specifying the investor's probability preference at each of the plurality of monetary amounts relative to a monetary range relevant to the investor;

allocating the investment funds among the investments to create an investment allocation by maximizing an expected value of a first probability density function of the investor's probability preferences determined as a function of a second probability density function of the portfolio's predicted market performance with respect to the investment funds and the investor's risk tolerance function; and displaying for each investment:
a graphical representation of a fractional allocation of the investment funds to the investment;
a graphical representation of a user specified range for the fractional allocation of the investment funds to the investment, the range having an upper and lower bound, each individually movable to redefine the range;
displaying a graphical representation of an expected return for the portfolio given the allocation of the investment funds among the investments; and,
re-determining the expected return and the allocation of the investment funds among the investments in the portfolio in response to an input moving the upper or lower bound of the range of at least one investment so as to require a change in the allocation of the investment funds to the investment.

15. The computer implemented method of claim 14, further comprising:

displaying a graphical representation of a fraction of the investor's own funds included in the investment funds, and a user specified range for the fractional allocation of the investor's own funds to the investment funds to the investment, the range having an upper and lower bound, each individually movable to redefine the range; and, displaying a graphical representation of a fraction of the investment funds representing investment funds that are borrowed funds as constrained by the investors upper and lower bounds.

16. The computer implemented method of claim 14, further comprising:

displaying a graphical representation of a range for the expected return, the range defined by one or more confidence intervals.

17. The computer implemented method of claim 14, further comprising:

displaying a graphical representation of a fraction of the investment funds representing investment funds invested in risk free investments.

18. A computer implemented method of allocating investment funds of an investor in a portfolio comprising a plurality of investments, comprising:

determining a risk tolerance function for the investor specifying the investor's probability preference at each of the plurality of monetary amounts relative to a monetary range relevant to the investor;

allocating the investment funds among the investments to create an investment allocation by maximizing an expected value of a first probability density function of the investor's probability preferences determined as a function of a second probability density function of the portfolio's predicted market performance with respect to the investment funds and the investor's risk tolerance function; and determining a plurality of allocations of the investment funds in the portfolio;

determining for each allocation a predicted performance curve of the portfolio given the allocation, the predicted performance defining for each of a plurality of predicted market performance values, a percentage of the investor's residual probability preference resulting from the allocation; and displaying the predicted performance curves.

19. A computer implemented method of allocating investment funds of an investor in a portfolio comprising a plurality of investments, comprising:

determining a risk tolerance function for the investor specifying the investor's probability preference at each of the plurality of monetary amounts relative to a monetary range relevant to the investor;

allocating the investment funds among the investments to create an investment allocation by maximizing an expected value of a first probability density function of the investor's probability preferences determined as a function of a second probability density function of the portfolio's predicted market performance with respect to the investment funds and the investor's risk tolerance function; and displaying on a single screen:

a first axis of probability preferences scaled between 0 and 1;

a second axis, perpendicular to the first axis, defining a range of monetary amounts including the investment funds;

the investor's risk tolerance function specifying the investor's probability preference at each of a plurality of monetary amounts;

the first probability density function for an allocation of the investment funds, the first probability density function displayed as a distribution on the first axis; and the second probability density function for the allocation, the second probability density function displayed as a distribution on the second axis.

20. A computer implemented method of allocating investment funds of an investor in a portfolio comprising a plurality of investments, comprising:

determining a risk tolerance function for the investor specifying the investor's probability preference at each of the plurality of monetary amounts relative to a monetary range relevant to the investor;

allocating the investment funds among the investments to create an investment allocation by maximizing an expected value of a first probability density function of the investor's probability preferences determined as a function of a second probability density function of the portfolio's predicted market performance with respect to the investment funds and the investor's risk tolerance function; and providing a plurality of reference gambles to the investor, each reference gamble defining the investor's probability preference with respect to a monetary amount.

21. The computer implemented method of claim 20, wherein providing a plurality of reference gambles comprises:

providing a question to the user, the question presenting first and second hypothetical outcomes, the outcomes equally likely, each outcome associated with a monetary amount;

receiving a user input in response to the question, the user input selected from a group including:
the first outcome;
the second outcome;
an undecided selection;

responsive to the user input being either the first outcome or second outcome:
changing the monetary amount associated with the selected outcome; and,
re-presenting the question to the user until the user input is the undecided selection.

22. The computer implemented method of claim 20, wherein each reference gamble presents first and second hypothetical outcomes, the outcomes equally likely, each outcome associated with a monetary amount, each monetary amount within a range between a first monetary amount representing a putative worst monetary amount for the investor, and second monetary amount representing a best monetary amount for the investor.

23. The computer implemented method of claim 20 wherein the plurality of reference gambles produce a plurality of paired probability preferences and monetary amounts, further comprising:

determining the investor's risk tolerance function from the plurality of reference gambles by an analytical regression over the plurality of paired probability preferences with respect to monetary amounts.

24. The computer implemented method of claim 20, wherein the plurality of reference gambles produce a plurality of paired probability preferences and monetary amounts, further comprising:

determining the investor's risk tolerance function from the plurality of reference gambles by one or more cubic splines fitting the plurality of paired probability preferences with respect to monetary amounts.

25. A computer implemented method of allocating investment funds of an investor in a portfolio comprising a plurality of investments, comprising:

determining a risk tolerance function for the investor specifying the investor's probability preference at each of the plurality of monetary amounts relative to a monetary range relevant to the investor;

allocating the investment funds among the investments to create an investment allocation by maximizing an expected value of a first probability density function of the investor's probability preferences determined as a function of a second probability density function of the portfolio's predicted market performance with respect to the investment funds and the investor's risk tolerance function; and defining a plurality of risk tolerance functions; and storing each risk tolerance function with data identifying the investor associated with the risk tolerance function;

displaying a plurality of risk tolerance functions;

combined selected ones of the displayed risk tolerance functions to form a mean risk tolerance function; and, displaying the mean risk tolerance function.

26. A computer implemented method of allocating investment funds of an investor in a portfolio comprising a plurality of investments, comprising:

determining a risk tolerance function for the investor specifying the investor's probability preference at each of the plurality of monetary amounts relative to a monetary range relevant to the investor;

allocating the investment funds among the investments to create an investment allocation by maximizing an expected value of a first probability density function of the investor's probability preferences determined as a function of a second probability density function of the portfolio's predicted market performance with respect to the investment funds and the investor's risk tolerance function; and replacing at least one of the investments from the portfolio with at least one new investment; and re-allocating the investor's funds among the investments in the portfolio by maximizing the expected value of the first probability density function of the investor's probability preferences determined as a function of the second probability density function of the portfolio's predicted market performance with respect to the investment funds and the investor's risk tolerance function.

27. A computer implemented method of allocating investment funds of an investor in a portfolio comprising a plurality of investments, comprising:

determining a risk tolerance function for the investor specifying the investor's probability preference at each of the plurality of monetary amounts relative to a monetary range relevant to the investor;

allocating the investment funds among the investments to create an investment allocation by maximizing an expected value of a first probability density function of the investor's probability preferences determined as a function of a second probability density function of the portfolio's predicted market performance with respect to the investment funds and the investor's risk tolerance function; and adding at least one new investment to the portfolio; and reallocating the investor's funds among the investments in the portfolio by maximizing the expected value of the first probability density function of the investor's probability preferences determined as a function of the second probability density function of the portfolio's predicted market performance with respect to the investment funds and the investor's risk tolerance function.

28. A user interface for a computer system, for evaluating and revising an investment allocation of fractional amounts of investment funds in a portfolio including a plurality of investments, comprising:

a first axis representing a range of fractional allocation values;

a second axis including:
  for each investment, a graphical representation of the fractional allocation value of the investment funds allocated to the investment;
  for each investment, a graphical representation of a user specified range for the fractional allocation values of the investment funds to the investment, the range having a graphically displayed upper and lower bound, each individually movable by the user to redefine the range; and, a graphical representation of an expected return for the portfolio given the investment allocation of the investment funds in the portfolio.

29. The user interface of claim 28, further comprising:

a graphical representation of a fraction of the investor's own funds included in the investment funds, and a user specified range for the fractional allocation of the investor's own funds to the investment funds, the range having an upper and lower bound, each individually movable to redefine the range; and, a graphical representation of a fraction of the investment funds that are borrowed funds (within constraints).

* * * * *